US011188445B2

(12) United States Patent
Knowles et al.

(10) Patent No.: US 11,188,445 B2
(45) Date of Patent: *Nov. 30, 2021

(54) GENERATING A TEMPORAL TOPOLOGY GRAPH OF A COMPUTING ENVIRONMENT BASED ON CAPTURED COMPONENT RELATIONSHIP DATA

(71) Applicant: VMware, Inc., Palo Alto, CA (US)

(72) Inventors: Christopher Knowles, London (CA); Blair Doyle, Hamilton (CA); Alex Bewley, Toronto (CA); Jimmy Park, London (CA)

(73) Assignee: VMware, Inc., Palo Alto, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/008,938

(22) Filed: Jun. 14, 2018

(65) Prior Publication Data
US 2019/0058643 A1 Feb. 21, 2019

Related U.S. Application Data

(60) Provisional application No. 62/547,351, filed on Aug. 18, 2017.

(51) Int. Cl.
*G06F 11/34* (2006.01)
*G06F 11/30* (2006.01)
(Continued)

(52) U.S. Cl.
CPC ........ *G06F 11/3495* (2013.01); *G06F 3/0482* (2013.01); *G06F 3/04847* (2013.01);
(Continued)

(58) Field of Classification Search
CPC ............. G06F 11/3495; G06F 11/3051; G06F 11/3006; G06F 11/301; G06F 11/3466;
(Continued)

(56) References Cited

U.S. PATENT DOCUMENTS 5,101,348 A * 3/1992 Arrowood ............. H04L 45/021
709/242
6,628,304 B2 9/2003 Mitchell et al.
(Continued)

OTHER PUBLICATIONS

Saraiya, et al., Visualization of Graphs with Associated Timeseries Data, IEEE 2005, pp. 225-232. (Year: 2005).
(Continued)

*Primary Examiner* — Michael W Ayers

(57) ABSTRACT

In a computer-implemented method for generating a temporal topology graph of a computing environment, managed component relationship data is received for a plurality of managed components of a computing environment, the managed component relationship data including parent/child information for a managed component of the plurality of managed components at a moment in time. The managed component relationship data is transformed into graphical data of a temporal topology graph of the computing environment, wherein the temporal topology graph includes the moment in time for each instance of the managed component relationship data within the temporal topology graph. The temporal topology graph including the managed component relationship data is generated based at least in part on the graphical data. The temporal topology graph for the computing environment is maintained at a service provider.

16 Claims, 20 Drawing Sheets

(51) Int. Cl.

| | | |
|---|---|---|
| *G06F 9/455* | (2018.01) | |
| *H04L 12/24* | (2006.01) | |
| *G06F 16/26* | (2019.01) | |
| *G06F 16/28* | (2019.01) | |
| *G06F 3/0482* | (2013.01) | |
| *G06F 3/0484* | (2013.01) | |
| *G06F 16/901* | (2019.01) | |
| *H04L 12/26* | (2006.01) | |
| *G06F 11/32* | (2006.01) | |
| *H04L 29/08* | (2006.01) | |

(52) U.S. Cl.
CPC ........ *G06F 9/45558* (2013.01); *G06F 11/301* (2013.01); *G06F 11/3006* (2013.01); *G06F 11/3051* (2013.01); *G06F 16/26* (2019.01); *G06F 16/288* (2019.01); *G06F 16/9024* (2019.01); *H04L 41/064* (2013.01); *H04L 41/065* (2013.01); *H04L 41/0645* (2013.01); *H04L 41/0686* (2013.01); *H04L 41/12* (2013.01); *H04L 41/145* (2013.01); *H04L 41/16* (2013.01); *H04L 43/045* (2013.01); *G06F 11/3093* (2013.01); *G06F 11/323* (2013.01); *G06F 11/3409* (2013.01); *G06F 11/3466* (2013.01); *G06F 2009/45562* (2013.01); *G06F 2009/45591* (2013.01); *G06F 2009/45595* (2013.01); *G06F 2201/86* (2013.01); *H04L 67/10* (2013.01)

(58) Field of Classification Search
CPC ............... G06F 11/323; G06F 11/3409; G06F 11/3093; G06F 16/26; G06F 16/288; G06F 16/9024; G06F 3/0482; G06F 3/04847; G06F 9/45558; G06F 2009/45562; G06F 2009/45595; G06F 2009/45591; G06F 2201/86; H04L 41/145; H04L 41/064; H04L 41/0645; H04L 41/065; H04L 41/0686; H04L 41/12; H04L 41/16; H04L 43/045; H04L 67/10

See application file for complete search history.

(56) References Cited

U.S. PATENT DOCUMENTS

| | | | |
|---|---|---|---|
| 6,885,644 B1 | 4/2005 | Knop et al. | |
| 6,888,554 B1 | 5/2005 | Decombe | |
| 7,349,980 B1 | 3/2008 | Darugar et al. | |
| 7,788,536 B1 | 8/2010 | Qureshi et al. | |
| 7,971,106 B2 | 6/2011 | Lovy et al. | |
| 8,370,483 B2 * | 2/2013 | Choong | H04L 67/12 709/224 |
| 9,112,895 B1 | 8/2015 | Lin | |
| 9,128,998 B2 | 9/2015 | Jackson | |
| 9,331,910 B2 | 5/2016 | Dutt et al. | |
| 9,537,720 B1 | 1/2017 | Baggott et al. | |
| 9,557,879 B1 | 1/2017 | Wang et al. | |
| 9,729,416 B1 | 8/2017 | Khanal et al. | |
| 9,893,968 B1 | 2/2018 | Nagargadde et al. | |
| 10,049,335 B1 | 8/2018 | Narkier et al. | |
| 10,178,067 B1 | 1/2019 | Kumar et al. | |
| 10,291,479 B1 | 5/2019 | Oren et al. | |
| 10,425,290 B1 | 9/2019 | Oren et al. | |
| 2008/0249916 A1 | 10/2008 | Kirch et al. | |
| 2009/0054743 A1 | 2/2009 | Stewart | |
| 2009/0245176 A1 | 10/2009 | Balasubramanian et al. | |
| 2010/0074141 A1* | 3/2010 | Nguyen | H04L 41/12 370/254 |
| 2010/0122270 A1* | 5/2010 | Lin | G06F 11/3006 719/318 |
| 2011/0029882 A1* | 2/2011 | Jaisinghani | H04L 41/12 715/736 |
| 2012/0036484 A1* | 2/2012 | Zhang | H04L 41/12 715/853 |
| 2012/0047394 A1 | 2/2012 | Jain et al. | |
| 2012/0155329 A1 | 6/2012 | Shaffer et al. | |
| 2013/0048408 A1 | 2/2013 | Schulze | |
| 2013/0091499 A1* | 4/2013 | Soundararajan | G06F 9/45558 718/1 |
| 2013/0173667 A1 | 7/2013 | Soderberg et al. | |
| 2014/0059178 A1 | 2/2014 | Dutta et al. | |
| 2014/0280900 A1* | 9/2014 | McDowall | H04L 45/02 709/224 |
| 2014/0355612 A1* | 12/2014 | Liu | H04L 45/42 370/392 |
| 2015/0033084 A1 | 1/2015 | Sasturkar et al. | |
| 2015/0215206 A1 | 7/2015 | Solis et al. | |
| 2016/0048408 A1* | 2/2016 | Madhu | G06F 11/2097 718/1 |
| 2016/0103883 A1 | 4/2016 | Ramani et al. | |
| 2016/0105350 A1* | 4/2016 | Greifeneder | H04L 41/046 709/224 |
| 2016/0147772 A1 | 5/2016 | Siegmund et al. | |
| 2016/0350173 A1 | 12/2016 | Ahad | |
| 2017/0104636 A1* | 4/2017 | Vora | H04L 41/0853 |
| 2017/0192850 A1* | 7/2017 | Dachere | G06F 11/328 |
| 2017/0299633 A1* | 10/2017 | Pietrowicz | H04L 63/1416 |
| 2018/0115455 A1 | 4/2018 | Garcia et al. | |
| 2018/0123903 A1* | 5/2018 | Holla | H04L 41/22 |
| 2018/0173687 A1* | 6/2018 | Noguero | G06F 16/9024 |
| 2018/0302306 A1 | 10/2018 | Carroll et al. | |
| 2018/0309636 A1 | 10/2018 | Strom et al. | |
| 2018/0316601 A1 | 11/2018 | Sackman et al. | |
| 2019/0058643 A1 | 2/2019 | Knowles et al. | |
| 2019/0068619 A1 | 2/2019 | Fan et al. | |
| 2019/0138372 A1 | 5/2019 | Tee | |
| 2019/0230015 A1 | 7/2019 | Lad et al. | |
| 2019/0394081 A1 | 12/2019 | Tahhan et al. | |

OTHER PUBLICATIONS

Natson, et al., Experiences with Monitoring OSPF on a Regional Service Provider Network, IEEE 2003, (Year 2003), 2003, pp. 1-10.

* cited by examiner ing a temporal topology graph of a computing environment, according to various embodiments.

GENERATING A TEMPORAL TOPOLOGY GRAPH OF A COMPUTING ENVIRONMENT BASED ON CAPTURED COMPONENT RELATIONSHIP DATA

RELATED APPLICATION

This application claims priority to the provisional patent application having Application No. 62/547,351, entitled "COLLECTION AND ANALYSIS OF REAL-TIME TOPOLOGY, CONFIGURATION AND EVENT INFORMATION IN A DATA CENTER ENVIRONMENT," with filing date Aug. 18, 2017, by Knowles et al., which is herein incorporated by reference in its entirety.

BACKGROUND

Virtual-machine technology essentially abstracts the hardware resources and interfaces of a computer system on behalf of one or multiple virtual machines, each including one or more application programs and an operating system. Cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Managing and troubleshooting customer data centers which include virtual servers as well as physical servers, virtual machines and virtual applications is often quite difficult. Moreover, any downtime associated with problems in the data center, or components thereof, can have significant impact on a customer relying on the data center.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
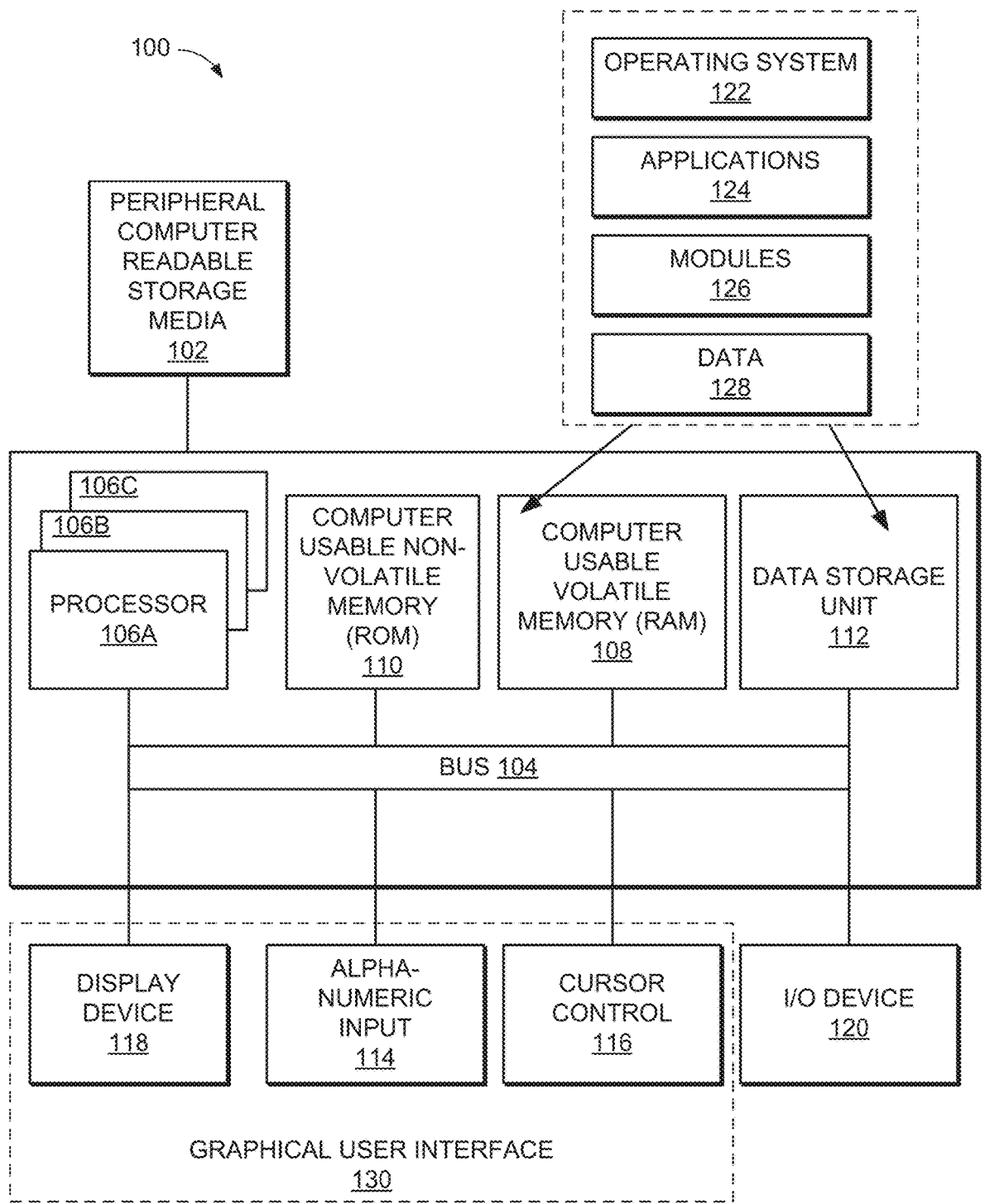
FIG. 1 illustrates an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "filtering," "receiving," "applying," "requesting," "aggregating," "communicating," "maintaining," "transforming," "generating," "accessing," "performing," "identifying," "effectuating," "correlating," "utilizing," "determining," "updating," "displaying," or the like, refer to the actions and processes of an electronic computing device or system such as: a host processor, a processor, a memory, a software defined network (SDN) manager, a system manager, a hyper-converged appliance, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system environment, upon which embodiments of the present invention may be implemented. An example cloud-based computing environment, upon which embodiments of the present invention may be implemented, is then discussed. A software-defined data center (SDDC) is a hyper-converged infrastructure (HCI) solution based on defined hardware configurations pre-integrated with a software-defined data center (SDDC) software. The EVO SDDC solution enables customers to deploy a fully self-contained Infrastructure-as-a-Service (IaaS) and/or Virtual Desktop Infrastructure (VDI) private cloud based on a complete SDDC architecture.

Embodiments described herein provide a computer-implemented method for building a plurality of continuous graphs of customer data centers, that is temporal in nature, the method including: receiving from a collector and at an analytics cloud, a first aggregation of data from a data center for a first time period; utilizing a domain specific language to transform the data into graphical data including nodes and edges of a graph for a first time; presenting the graphical data in a visual representation; repeating the receiving, utilizing, and presenting on a second aggregation of data from the data center for a second time period; and comparing the graphs over time to build a continuous temporal graph of the data center. In some embodiments, the method further includes: utilizing a domain specific language for analysis and codification of the data, to support type questions, known issue detection, etc., instead of writing graph traversal algorithms for the data. In some embodiments, the method further includes utilizing the analysis and codification of the data for anomaly detection based on streaming data center events via the temporal graph as it related to virtual databases and products.

The present technology uses a standalone collector methodology that collects and transmits product usage data back to a remote service provider (e.g., the VMware Analytics Cloud (VAC) infrastructure). The collector not only captures telemetry data, it also listens for changes and events which are streamed back to the remote service provider in near-real time. Data collected includes configuration, feature and performance data. In some embodiments, the collector also captures and product/component internal data in the form of task events that indicate internal operations of the product/component. The remote service provider uses this data to proactively review the customer environment, perform research analyses for Service Requests (SRs), and provide prescriptive recommendations to improve overall environmental health and performance.

Embodiments described herein provide a proactive computing environment support technology including three components: a computing environment temporal data collector, a temporal computing environment topology viewer, and a proactive computing environment temporal analytics component. The described embodiments provide a standalone temporal data collector that collects and transmits product usage data back to a remote service provider. The temporal data collector not only captures telemetry data, it also listens for changes and events which are streamed back to remote service provider in real-time or near-real time. Data collected includes configuration, feature and performance data.

The temporal data collector is a standalone data aggregator that collects and transmits event data and relationship data for components of the computing environment to a remote (e.g., off-site) service provider for proactive analytics. One example of a remote service provider is the VMware Analytics Cloud (VAC) infrastructure. It should be appreciated that the remote service provider can receive data and provide proactive for a plurality of computing environments (e.g., multiple customers). In some embodiments, the proactive analytics are improved by comparing the analytics across multiple computing environments. In such a way, the service provider can utilize analytics for one computing environment for providing proactive analytics for another computing environment. It should be appreciated that such functionality can be performed without exposing the data or knowledge across the computing environments, by securely controlling the data for the separate computing environments.

The temporal computing environment topology viewer is a portal that the remote service provider can access to view the current state of the computing environment, viewing topology to easily grasp the scope and complexity of the components (e.g., data centers) of the computing environment. In some embodiments, the temporal computing environment topology viewer is web-based. The temporal computing environment topology viewer provides an investigation and scoping solution, and enables the ability to scroll back in time and observe how the computing environment has changed while drilling down into specific configurations, tasks and events that drove those changes. The temporal computing environment topology viewer provides for the temporal viewing of the computing environment in a non-product specific way to consider the intertwined relationships across the components of the computing environment as one holistic solution.

The proactive computing environment temporal analytics component utilizes a rule based analysis engine to identify known issues and deviations from best practice configurations in order to produce results that can be utilized the service provider and/or administrator of the computing environment. In some embodiments, the proactive computing environment temporal analytics component is integrated into the temporal topology viewer in order to make use of an efficient rule-based analysis engine where a library of support intelligence, product knowledge, and logic is stored and used to analyze the inbound streams of data to produce recommendations and reports that can be delivered through multiple channels to the computing environment. For example, a determination can be made as to whether a computing environment has deviated from a service provider validated deployment (e.g., a VMware validated design (VVD)), a misalignment to best practice configurations, or identifying failures and incidents that are tied directly to remediation steps through knowledgebase articles. It should be appreciated that proactive assistance can be delivered either by direct support engagement with technical support engineers (TSEs) of the service provider or automatically through self-service channels.

In some embodiments, the proactive computing environment temporal analytics component provides reports, such as a proactive operation summary report and/or a health assessment report. The proactive operational summary report is an on-going wellness summary of the computing environment that can be generated periodically based on constant data flow of computing environment and run-time analysis that provides proactive data review and compilation of field notices/alerts/knowledge base's/security issues, as well as research analysis and run-time analysis based recommendations. The health assessment report is a checkup summary that includes recommendations to promote improvements in overall environment health and performance, configuration review, prescriptive recommendations on design compliance, best practices recommendations, etc.

For example, management of a virtual network can include monitoring and awareness of the health, capacity, performance, and environment. Example virtual network health information includes, data health, infrastructure health, network health, and input/output operations per second (IOPS). Example capacity information includes data efficiency, data distribution, and usage predictions. Example performance information includes IOPS, throughput, latency and latency hotspots. Example environment information includes VM overview, host overview, version usage, enabled features, and the like.

Importantly, the embodiments of the present invention, as will be described below, provide an approach for building the continuous graphs of customer data centers, that is temporal in nature, developing a domain specific language for making it easy to analyze and codify, support type questions, known issue detection, etc., rather than having to know how to write graph traversal algorithms; and performing anomaly detection based on streaming data center events and the temporal graph as it related to virtual databases and products. It should be appreciated that a continuous graph refers to a single graph with no disconnected subgraphs. In conventional approaches, the datacenter was not graphically represented, and there was no means for providing the graph. Further, because the different views of the data center were not graphical in nature, it was impossible to compare them graphically, analyze the graphical changes over time, or provide visual indicators of the graphical nature to the technicians, customers and the like. Thus, conventional approaches to data center representation are tedious, confusing, time-consuming, and often result in confusion to the customer when changes and troubleshooting are explained.

Instead, the present embodiments, as will be described and explained below in detail, provide a previously unknown procedure for building the continuous graphs of customer data centers, that is temporal in nature, developing a domain specific language for making it easy to analyze and codify, support type questions, known issue detection, etc., rather than having to know how to write graph traversal algorithms; and performing anomaly detection based on streaming data center events and the temporal graph as it related to virtual databases and products.

As will be described in detail, the various embodiments of the present invention do not merely implement conventional remote management processes on a computer. Instead, the various embodiments of the present invention, in part, provide a previously unknown procedure for building the continuous graphs of customer data centers, that is temporal in nature, developing a domain specific language for making it easy to analyze and codify, support type questions, known issue detection, etc., rather than having to know how to write graph traversal algorithms; and performing anomaly detection based on streaming data center events and the temporal graph as it related to virtual databases and products. Hence, embodiments of the present invention provide a novel process for management of customer data center which is necessarily rooted in computer technology to overcome a problem specifically arising in the realm of data centers and distributed systems.

The described embodiments provide a proactive support technology that uses automation to collect configuration, feature, and performance data through data driven analytics. This can radically transform visibility into a computing environment—what component are running and how the components are performing. This increased visibility will help improve reactive break/fix support while also delivering proactive computing environment support. By knowing and understanding what is occurring operationally within a computing environment in real-time, the described embodiments improve performance of monitored computing environments providing assistance on support requests and proactive guidance on configuration best practices and design compliance. Moreover, where the service provider manages more than one computing environment, the knowledge and analytics gained from monitoring one computing environment can be leveraged to proactively improve the analytics performance of other monitored computing environments.

Embodiments disclosed herein improve the capabilities of support organization to support our customers who use products both on the premise and in the cloud through the use of data driven analytics. By improving visibility into not only what our customers buy, but how they deploy and use the solutions day to day, customer-facing teams will be more successful through driving informed interactions across all our customer touch points. Thus, the technology described herein will reduce time-to-resolution for service requests and contribute to enhance customer relationship-building due to a more informed interaction with the customer's environment.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or in a number of different computer systems including, but not limited to, general purpose networked computer systems, embedded computer systems, routers, switches, server devices, client devices, various intermediate devices/nodes, stand-alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 1066, and 106C are present. Conversely, system 100 is also well suited to having a single processor such as, for example, processor 106A. Processors 106A, 1066, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 1066, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via an input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations in RAM 108, computer-readable storage media in data storage unit 112, peripheral computer-readable storage media 102, and/or other tangible computer-readable storage media.

Figure 2:
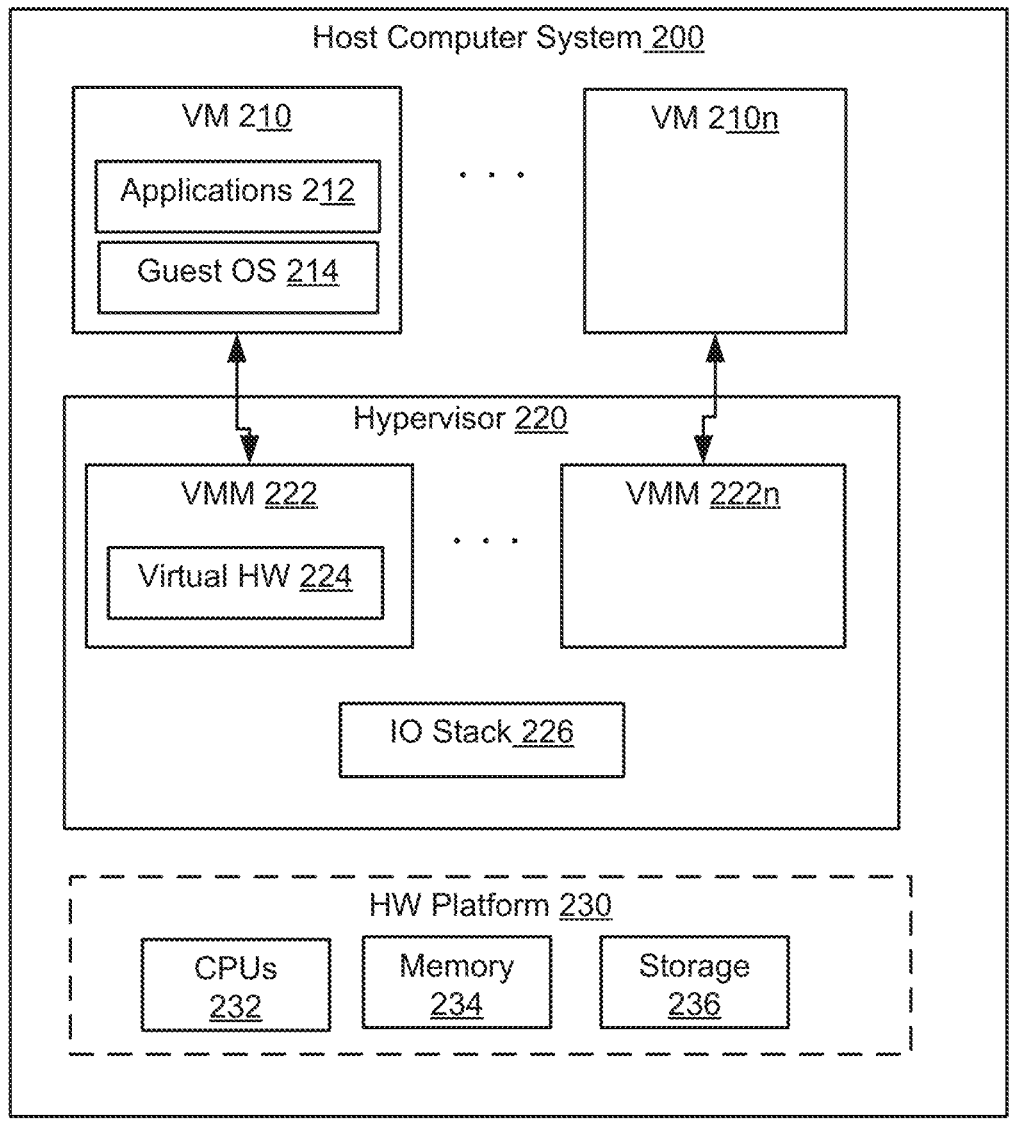
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems. Moreover, it should be appreciated that operating systems are updated over time to different versions of the operating system (e.g., to provide improved functionality and/or to address security concerns). In accordance with various embodiments, operating system versions can refer to a particular release of an operating system and/or a particular build of an operating system. For example, a security patch applied to an operating system may refer to a new version of the operating system.

IOs issued by guest OS 214 through the native file system layer appear to guest OS 214 as being routed to one or more virtual disks provisioned for virtual machine 210 for final execution, but such IOs are, in reality, reprocessed by 10 stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

In various embodiments, a management interface component, such as a software defined network (SDN) manager (e.g., VMware's NSX manager), provides control for virtual networking services. The management control interface provides configuration management for components (e.g., hosts, virtual servers, VMs, data end nodes, etc.) of the virtualized environment. To effectuate management of the virtual network, management interface components are configured to manage and/or utilize logical objects (e.g., managed logical objects and non-managed logical objects). Logical objects with a virtualized environment (e.g., a virtualization infrastructure) may make reference to or be referenced by other logical objects In various embodiments, a virtual network, using at least one hypervisor 220, reproduces the Layer 2 through Layer 7 networking services (e.g., switching, routing, access control, firewalling, quality of service (QoS), and load balancing) as logical objects. Accordingly, these networking services can be programmatically assembled (e.g., by a networking administrator) in any combination, to produce individual virtual networks. Virtual networks are independent of underlying network hardware (e.g., hardware platform 230), allowing for network hardware to be treated as a networking resource pool that can be allocated and repurposed as needed.

Example Computing Environment

Figure 3A:
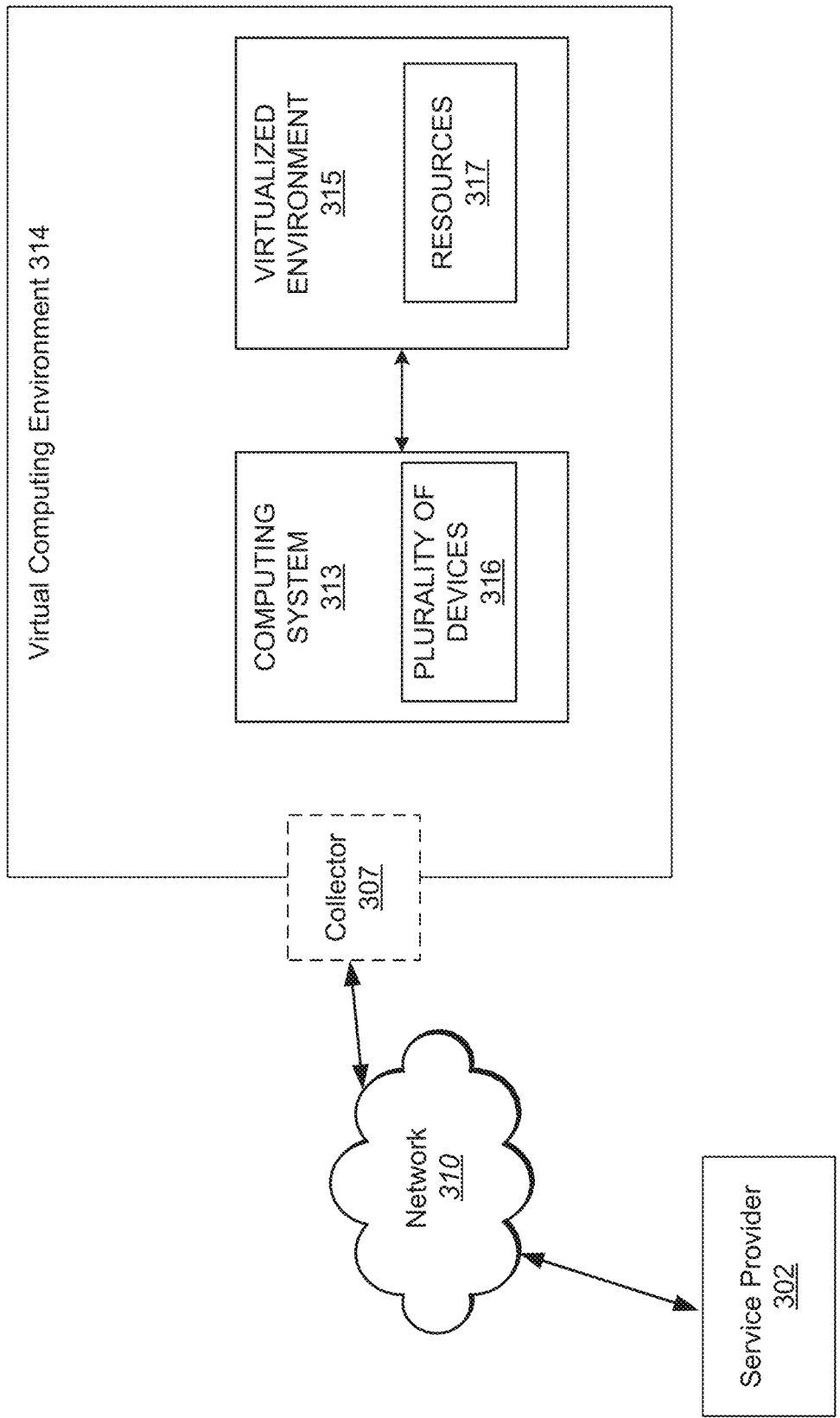
FIG. 3A illustrates an example cloud-based computing environment communicatively coupled with service provider, according to various embodiments.

FIG. 3A illustrates an example virtual computing environment communicatively coupled with a service provider, in accordance with various embodiments. In the cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In FIG. 3A, a system administrator for an organization, using service provider 302, accesses the virtual computing environment (VCE 314), through a connection such as, but not limited to, the network 310.

For example, collector 307 can provide configuration information about VCE 314 to service provider 302. The collector 307 is a standalone aggregator that collects & transmits product usage data back to the service provider 302 infrastructure. The collector 307 not only captures product usage data, it also listens for changes and events which are streamed back to service provider 302 in real-time or near-real time. In one embodiment, service provider 302 is a VMware Analytics Cloud (VAC).

In one embodiment, VCE 314 (or virtualization infrastructure) includes computing system 313 and virtualized environment 315, according to various embodiments. In general, computing system 313 and virtualized environment 315 are communicatively coupled over a network such that computing system 313 may access functionality of virtualized environment 315.

In one embodiment, computing system 313 may be a system (e.g., enterprise system) or network that includes a combination of computer hardware and software. The corporation or enterprise utilizes the combination of hardware and software to organize and run its operations. To do this, computing system 313 uses resources 317 because computing system 313 typically does not have dedicated resources that can be given to the virtualized environment 315. For example, an enterprise system (of the computing system 313) may provide various computing resources for various needs such as, but not limited to information technology (IT), security, email, etc.

In various embodiments, computing system 313 includes a plurality of devices 316. The devices are any number of physical and/or virtual machines. For example, in one embodiment, computing system 313 is a corporate computing environment that includes tens of thousands of physical and/or virtual machines. It is understood that a virtual machine is implemented in virtualized environment 315 that includes one or some combination of physical computing machines. Virtualized environment 315 provides resources 317, such as storage, memory, servers, CPUs, network switches, etc., that are the underlying hardware infrastructure for VCE 314.

The physical and/or virtual machines of the computing system 313 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The VCE 314 may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 313 may be a cloud environment, built upon a virtualized environment 315. Computing system 313 may be located in an Internet connected datacenter or a private cloud computing center coupled with one or more public and/or private networks. Computing system 313, in one embodiment, typically couples with a virtual or physical entity in a computing environment through a network connection which may be a public network connection, private network connection, or some combination thereof. For example, a user may connect, via an Internet connection, with computing system 313 by accessing a web page or application presented by computing system 313 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESXTM hypervisor, a VMware Exit hypervisor, etc.) For example, if hypervisor is a VMware ESXTM hypervisor, then virtual functionality of the host is considered a VMware ESXTM server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a virtual system are provided with respect to FIG. 3B.

During use, the virtual machines perform various workloads. For example, the virtual machines perform the workloads based on executing various applications. The virtual machines can perform various workloads separately and/or in combination with one another.

Example VMware EVO SDDC Rack

Figure 3B:
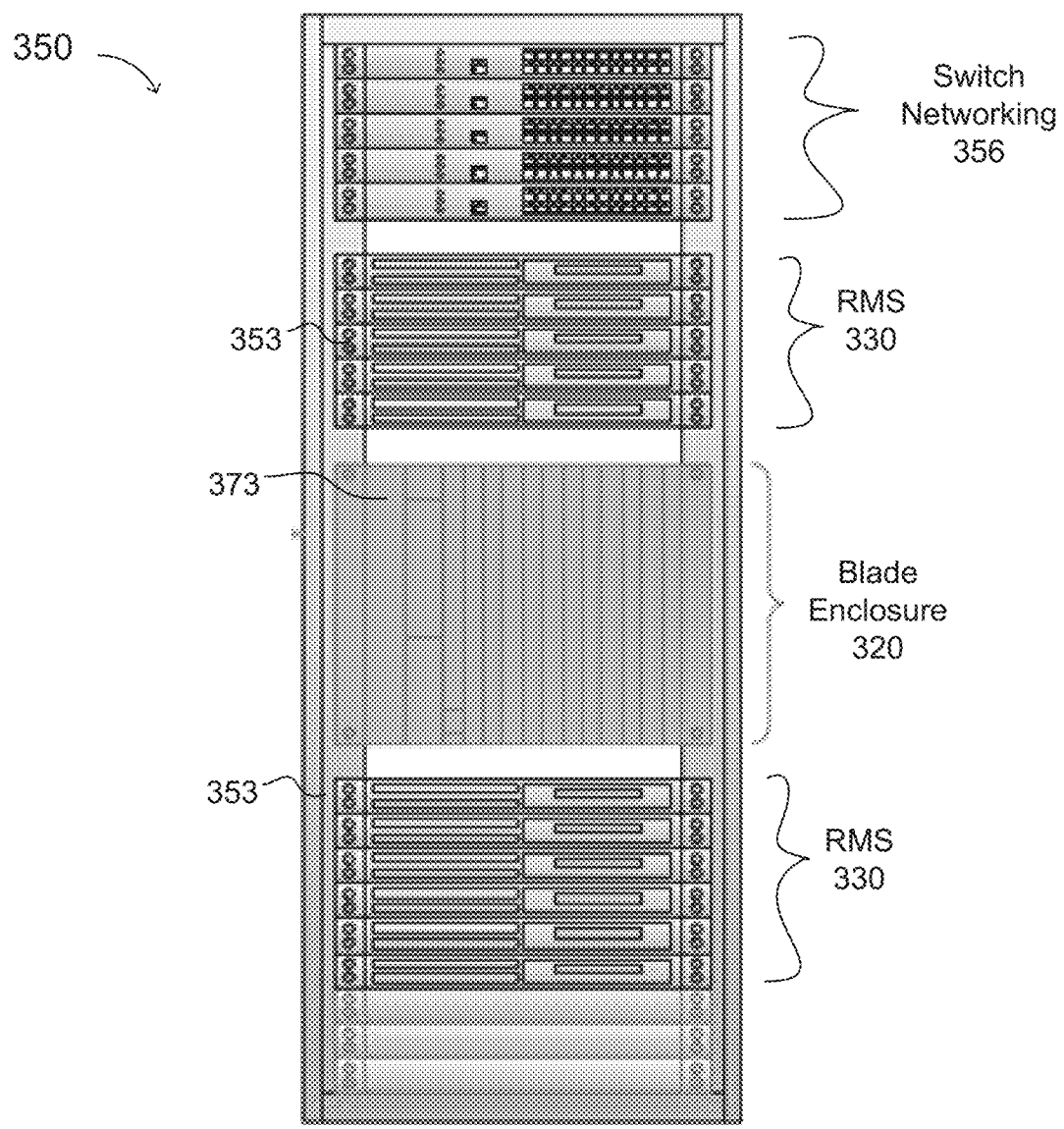
FIG. 3B, illustrates a block diagram of a VMware EVO SDDC rack upon which embodiments described herein may be implemented.

With reference now to FIG. 3B, a block diagram of a VMware EVO SDDC rack 350 (hereinafter SDDC rack 350) is shown in accordance with an embodiment. In one embodiment, SDDC rack 350 is a combination of software and hardware that are stored on a rack. However, the technology is also suited to one or more components of SDDC rack 350 being stored in locations other than the rack. Moreover, although there are some specific organizations of SDDC rack 350 discussed herein and contained in the figures, the technology may be well suited to different arrangements, organization, or the like. In general, SDDC rack 350 utilizes the concepts of virtualization across all data center resources and services (compute, storage, and networking) to deliver a fully automated, zero-downtime infrastructure that can transparently include different hardware over time. SDDC rack 350 provides abstraction, pooling, and automation of the compute/storage/networking infrastructure services. Under SDDC rack 350, policy-driven automation will enable provisioning and ongoing management of both physical and logical compute, storage, and network services.

In FIG. 3B, SDDC rack 350 includes switch networking 356, blade enclosure 320, and rack server or rackmount servers (RMS) 330.

Switching network 356 may also include management capabilities that are part of a dedicated management infrastructure running in each physical rack. The management capabilities include aspects such as inventory management, security management, performance management, and availability management.

Inventory management refers to aspects such as a virtual resource manager (VRM), and the like. VRM is a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. For example, the VRM will automatically discover new devices and processes hardware events (e.g., alarms, sensor data threshold triggers) and state changes. VRM then exposes events and state changes to the rest of the SDDC rack 350 in a hardware-independent manner. VRM also supports rack-level boot-up sequencing of hardware components and provides services such as secure, remote, hard reset of these components.

In general, VRM manages the physical components of the physical rack, e.g., blade(s) 373 in blade enclosure 320, servers in RMS 330, and the like; and maintains a corresponding software physical rack object. In other words, VRM monitors the hardware health of the switches and hosts and reports each one's health status. Thus, the VMware EVO SDDC system calculates the hardware health state of the resource based on the current set of alerts that the VRM has raised for that hardware resource and the severities of those alerts, including any alerts on the hardware Field Replaceable Units (FRUs) contained within that resource.

In one embodiment, security management manages remoted disks and access to one or more resources in rack 350. Security management may manage access using secure industry authentication schemes.

In one embodiment, performance management matches application performance needs with available infrastructure. Availability management matches application availability requirements for the given application.

Switch networking 356 includes one or more different switch and network devices that allow rack 350 to communicate with different racks, different switches, switches from different manufacturers, racks with different operating systems, and the like. A switch in switch networking 356 may be any of a number of switch types, such as, for example, a management switch, a top of rack (TOR) switch, spine switch, or the like.

Blade enclosure 320 is an enclosure to host one or more blade server(s) 373. Similarly, RMS 330 refers to one or more rack server(s) 353 stored in rack 350. In general, server 353 may be any of a plurality of server types. One example of a server's characteristics may be an Intel x86 based server that contains redundant, multi-gigabit network interfaces, power supplies, as well as a combination of hard drives and solid state drives. Although in FIG. 3B, a specific number of servers, blades, and switches are shown, it should be appreciated that one embodiment of a full rack may include 24 nodes which may be include a number of servers, a number of blades, a number of switches, a number of other components, and the like. Thus, the use of arrangement provided in the diagram and used in the discussion is merely for purposes of clarity.

Collector 307 is an on-premises appliance that collects a set of data from customer data centers across the entire product footprint and then streams to service provider 302 infrastructure in real-time or near real-time. For example, the collected sets of data are then streamed over the network 310 to the service provider 302. In one embodiment, it is a continuous stream of data from the products within the VCE 314.

For products that sit inside secure data center networks with no access to the network 310. The collector 307 sits in an intermediate area where it is on a network that is trusted to talk into the data center network. But it can also, as an individual network endpoint on the network, be allowed access to talk to a service provider 302 endpoint to send the data back to the service provider 302. So a small security footprint can be on network 310 while there is no connectivity requirements for the data center out to network 310 to get data back to the service provider 302.

Example Collector

Figure 4:
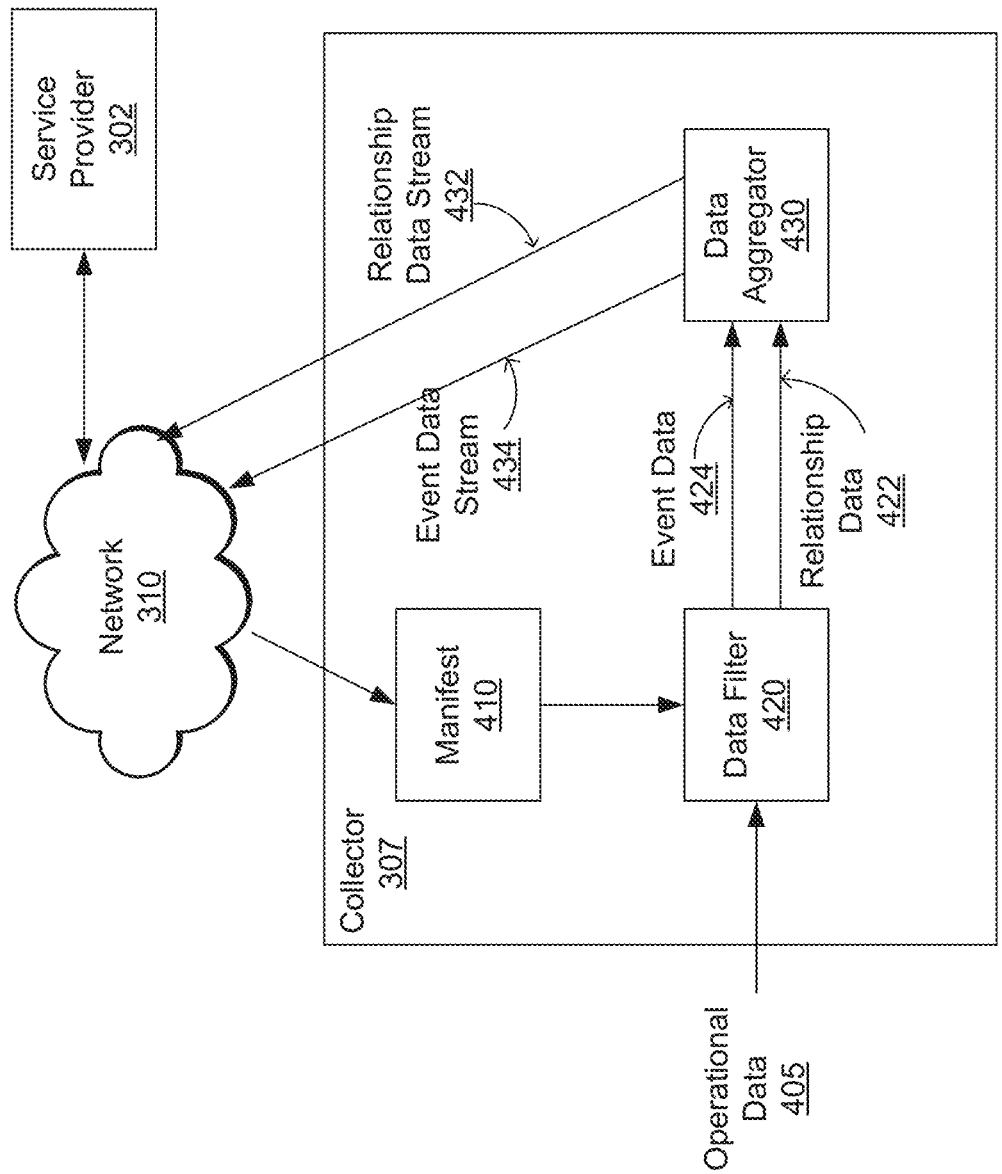
FIG. 4 illustrates a block diagram of a collector, in accordance with various embodiments.

FIG. 4 illustrates a block diagram of a collector 307, in accordance with various embodiments. Collector 307 includes manifest 410, data filter 420, and data aggregator 430. In some embodiments, collector 307 is a virtual appliance that is a fully packaged version of the collector and its user interface. Collector 307 is installed within a computing environment (e.g., VCE 314). In one embodiment, collector 307 is installed as a virtual machine with read-only privileges to one of more management interface components (e.g. VMware vCenters and/or NSX managers/controllers).

In some embodiments, the collector 307 is a Java application that runs within a PhotonOS Virtual Appliance (VA). Collector 307 acts as a gateway from a computing environment to funnel configuration and event information to a service provider for analysis and support case resolution. The collector 307 can be dynamically updated (e.g., through its call-home mechanism) through a global manifest maintained at service provider 302. Manifest 410 is a locally stored version of the global manifest, and controls the filtering of collected operational data 405 by collector 307.

In some embodiments, a collector 307 is registered with service provider 302 before it can send data to be processed. An identifier in the service provider 302 KV is created in order to share data with service provider 302. The level of service provided to the computing environment is further managed by the level of service maintained by the computing environment. The level of service indicates what reporting and analysis offerings are given back to the customer responsible for the computing environment.

Collector 307 is configured to communicate with service provider 302 to provide a data push for communicating event data 424 and relationship data 422. Collector 307 is also configured to retrieve data from service provider 302 (e.g., from a public key/value store) for retrieving data that is globally accessible to all collectors in all managed computing environment (e.g., manifest 410), collector/customer specific information, or command sequences (e.g., to shutdown the collector, initiate updates, or post informational messages. In some embodiments, collector 307 has a web server that provides a customer facing on-premise UI for configuration and management.

In one embodiment, upon startup (and period checks), collector 307 pulls down a global manifest from the service provider 302 KV store under a shared configuration file. The collector 307 can be configured (via command line file edits) to use this file, request a custom manifest, or only use a locally stored manifest. It should be appreciated that there can multiple manifests (versioned) with different identifiers on the service provider 302 side. The manifest can be ordered in the way their version changed. The manifest poller starts downloading manifest in this order and tries to read them in its current format. In some embodiments, the first downloaded manifest that can be parsed in the current collector format is stored as manifest 410.

Collector 307 is configured to capture operational data 405 within a computing environment (e.g., VCE 314), wherein the computing environment includes a plurality of managed components, where the managed components are interrelated. In some embodiments, at least a portion of the managed components are sourced from the same provider (e.g., manufacturer). In embodiments where the managed components are commonly sourced, the provider of the managed components may have additional insights into the interrelated activities and interconnectivity of the components, allowing for enhanced analytics. For example, the provider of the components can be the service provider 302. In some embodiments, the computing environment is a datacenter and the plurality of managed components includes hardware components and virtual components of the datacenter. In some embodiments, collector 307 is a virtual appliance residing within the computing environment. In some embodiments, collector 307 is communicably coupled components of the computing environment via a management interface component of the plurality of managed components Collector 307 dynamically filters the operational data 405 within the computing environment to identify event data 424 and relationship data 422. As used herein, operational data refers to any data communicated over the computing environment. Collector 307 filters the event data 424 and relationship data 422 from the operational data 405 at data filter 420. In some embodiments, the filtering of operational data 405 is performed by the collector 307 according to manifest 410, wherein the manifest 410 is configurable by the remote service provider 302 (e.g., the manifest 410 is extensible). For example, collector 307 can receive an update to the manifest 410 from the remote service provider 302, and apply the update to manifest 410. In some embodiments, collector 307 requests available updates to the manifest 410 from the remote service provider 302.

The event data 424 is data generated as a function of the regular component operations. An event is a data object type that contains information about state changes of managed components of a computing environment. Events include user actions and system actions that occur on datacenters, datastores, clusters, hosts, resource pools, virtual machines, networks, and distributed virtual switches. Examples of events include, without limitation: Powering a virtual machine on or off, creating a new virtual machine, installing applications on a guest OS of a virtual machine, configuring or reconfiguring a component, or adding a component (hardware or software) to the computing environment. Event data 424 includes information describing the event and temporal information (e.g., a time stamp) related to the event.

The relationship data 422 is data generated by a component indicating the related components (e.g., parent/child components) of the component. The components can be represented as objects, and collector 307 receives parent/child relationship information for objects. In some embodiments, the relationship information 422 is every time there is a change to the topology of the computing environment. For example, if a component is added, removed, or moved within a computing environment, relationship data 422 is generated. Another example of relationship data 422 is a component failure (e.g., hard drive failure). It should be appreciated that relationship data 422 may be generated coincident to an instance of event data 424. Relationship data 422 includes information describing the relationship between components and temporal information (e.g., a time stamp) related to the event.

Collector 307 communicates the event data 424 and relationship data 422 to a remote service provider 302 configured to perform analytics on the event data 424 and relationship data 422. In one embodiment, data aggregator 430 aggregates the event data 424 and relationship data 422 and transmits the event data 424 and relationship data 422 to service provider 302 in real-time or near real-time. In some embodiments, collector 307 communicates the event data 424 and relationship data 422 to service provider 302 as it is received (e.g., in real-time). In some embodiments, collector 307 communicates the event data 424 and relationship data 422 to service provider 302 at some interval (e.g., periodically or upon receiving an amount of the event data 424 and relationship data 422). In some embodiments, event data 424 and relationship data 422 are communicated to service provider 302 over separate data streams (e.g., event data stream 434 and relationship data stream 432.

Service provider 302 is configured to generate a temporal topology graph of the computing environment. The relationship data 422 is received, where component relationship data includes parent/child information for a managed component of the plurality of managed components at a moment in time. The relationship data 422 is transformed into graphical data of a temporal topology graph of the computing environment, wherein the temporal topology graph includes the moment in time for each instance of the relationship data 422 within the temporal topology graph. A temporal topology graph including the relationship data 422 is generated based at least in part on the graphical data. The temporal topology graph for the computing environment is maintained at service provider 302.

Example Service Provider

Figure 5:
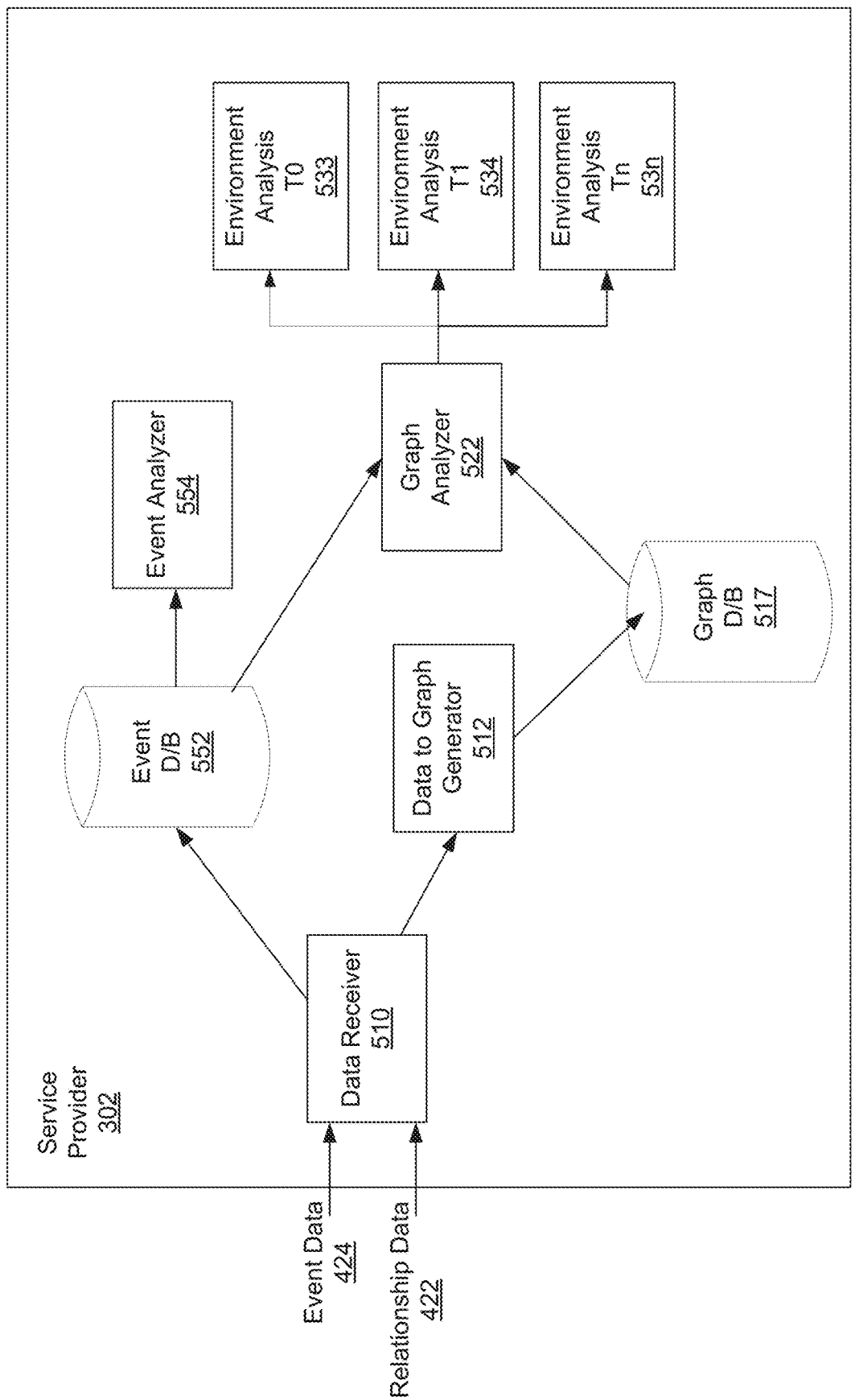
FIG. 5 illustrates a block diagram of a service provider, in accordance with various embodiments.

FIG. 5 illustrates a block diagram of a service provider 302, in accordance with various embodiments. With reference now to FIG. 5, in one embodiment, event data 424 and relationship data 422 is received at data receiver 510 of the service provider 302 from collector 307 for parsing the received data and directing event data 424 to event database 552 and directing relationship data 422 to data to graph generator 512. In one embodiment, a temporal topology graph is generated based on relationship data 422. In such an embodiment, event data 424 is used for enhanced visualization of the impact of events on temporal topology changes and analytics, but is not needed for generation of a temporal topology graph. In some embodiments, event analyzer 554 receives event data 424 from event database 552, and performs analysis using the event data 424. Relationship data 422 gets written by a script at data to graph generator 512 to a graph database 517 that is different than a traditional relational database, where the data is stored as nodes and edges the way a graph is described. In one embodiment, the nodes comprise information identifying the components and the edges comprise relationship information between the components.

For example, at time zero, (the first time it is turned on in the computing environment) a complete graph model is built of what the data center environment looks like, where: The nodes (e.g., nodes 604-607) in the graph are concrete objects, such as virtual machines, network ports, switches, data stores, hosts, clusters, etc.; the edges (e.g., 631-634) of the graphs are the relationships between all of those things; and the body of the node (e.g., 651-654), or the object in the graph, within which everything that is known about the object is stored. For example, for a virtual machine the body of a node may include: configuration parameters, number of CPU's, how much memory, etc. In one embodiment, everything that is known about the object can be hundreds of facts about the object. The full temporal topology graph is stored in the database 517.

As part of the completion of the graph ingest, another job is initiated, e.g., graph analyzer 522 runs a scripting language that analyzes graphs and codifies the assessment of the graph to formulate questions about the customers environment; e.g., is it deployed correctly, are things configured properly, are there any known issues that can be detected with a script. In one embodiment, graph analyzer 522 also accesses event data 424 from event database 552 for enhanced analysis and visualization of the impact of events on temporal topology changes and analytics. In one embodiment, the assessment results in environment analysis T0 533.

This full update can be done by default over a set period (e.g., every 12 hours, every day, etc.) The full update provides all information again. Every time the full update is performed, it is reconciled what the current state of the graph. The reconciliation identifies any drift between the configuration state the graph represents and the reality of the customer environment.

At another time, e.g., time 1 (1 second, 2 minute, 1 hour later, etc.) driven by when the data center does something and the changes are subscribed to; e.g., someone deploys a virtual machine, changes a configuration setting, etc. Whenever the event occurs, the information is packaged up and sent to the service provider 302. Then a task gets the data and builds the future state of the graph, e.g., the graph looked like X now they build a new graph that looks like Y that represents the now state of the graph, e.g., environment analysis T1 534.

As the changes stream in (e.g., as relationship data 422), the temporal topology graph can be navigated through time. For example, the temporal topology graph can show what the data center looked like at time zero or at time n, or anywhere in between (e.g., environment analysis Tn 53*n*). The temporal topology graph can show how the temporal topology graph changed over time, such that a user can step incrementally through the temporal topology graph and see what new nodes came into the temporal topology graph, what relationships came in, what relationships were deleted, etc.

The facts about any object within the temporal topology graph can be analyzed to see what changed about the entity within the temporal topology graph and how it changed over the period of time.

The building of the continuous temporal topology graph of the computing environment provides the ability to analyze the graph in order to codify the knowledge of the system administrator to allow them to easily and effectively analyze the graph in order to produce results that then become actionable by other entities or processes.

Embodiments described herein provide for enhanced analytics of a computing environment using the temporal topology graph and event data maintained at a service provider. The computing environment is analyzed to determine whether the computing environment has, for example, deviated from known best practice configurations, compliance status for areas such as hardware compatibility and software interoperability. In addition, known problems or issues that have publicly accessible resolutions via a service provider knowledge base will be detected and information presented to administrators of the computing environment, e.g., through a Web Client plugin interface. Some embodiments utilize a common collector framework (CCF) in order to identify state changes in customer environments that relate to known problems, issues or failures. In addition to failure detection, deviation from identified best practices will also be reported. These items are known as "Alerts".

Users will be exposed to the results of the analysis, e.g., through a Web Client plugin or dashboard. Dashboards containing observed incidents, solutions (KB articles) as well as best practices (white papers etc.) Users will be able to track, report and take action on observed alerts, including options to open a Support Request (SR) with the service provider's support teams in the event a recommended solution did not fully address the alert reported by the service provider.

The service provider receives data from the collector and performs analyses such as determining alignment with best practices, comparing deployed products with licensing history, and determining if a problem is a known issue that can be addressed with an automatic remediation solution. The platform also enriches collected data with information such as support requests and active investigations to perform further analyses.

The service provider analytics platform performs analysis of the computing environment for delivering rich insights and recommendations. The service provider analytics platform uses rules to perform anything from simple checking of data such as configurations and patch levels, to complex, cross-product, cross-cloud checks. In some embodiment, the issue and solution is fed into an analytics library which includes a plurality of detection rules which is available for analysis across a plurality of computing environments. In other words, the analytics and results of the analytics performed on one computing environment can be leveraged in other computing environments under the analytic management of the service provider. In this way, the service provider analytics platform can build and continue to evolve a comprehensive rules engine.

In other embodiments, the service provider analytics platform uses machine learning to perform anomaly detection via pattern matching. Pattern matching is performed primarily on the event data to identify particular patterns. For example, an anomaly might be detected if an event is not located within a particular pattern. Pattern matching looks for out of place sequences of events, recognized patterns of events, and/or non-recognized patterns of events. The service provider analytics platform can identify these patterns and determine corrective actions based on the patterns. In other embodiments, the temporal topology graph can be correlated to the event data, for understanding the impact of events on the topology of the computing environment.

For example at time 1 (T1), there are hundreds of rules that are run against the computing environment. The result may be that everything looks good, no errors or other introductions to the environment that should not be there are detected. Then at time n (Tn), the new state is analyzed and it can be determined that a number of issues exist in the computing environment warranting a warning or critical state because of a topology change that occurred. The customer, or a system administrator, can be alerted that the computing environment has entered a non-ideal state, including the details as to what occurred causing the non-ideal state. Thus, the customer, or system administrator, is alerted as to what the negative state is, but also informed as to the previous last known good state was, and provided with information to be able to revert the computing environment back to the last good state.

Moreover, the information learned from resolution of the example T1 to Tn issue causing the alerts can then be used to analyze warn other computing environment (e.g., belonging to other customer) that are about to make or made a similar change in their computing environment. Thus, prior to the next customer making the change and receiving the non-ideal state status, the situation can be resolved. Either the change is limited to what was known to be the problem, or a solution is provided in advance so that the non-ideal state is avoided completely.

When the scripting language runs and the rules are evaluated against the computing environment that data is then written back to database 517 such that downstream processes, such as graph analyzer 522, can then consume the data. The downstream processes can be used to visualize it, further analyze it, push it into other processes, etc. For example, a process that a human understandable report from the analytics data, which can be given to the customer or system administrator e.g., presented on a graphical user interface (UI) (e.g., UI 600).

The human understandable reports that are created can then be watched over time to see how the computing environment is changing, e.g., its overall health state. Business intelligence teams can take in the data and look at overall health of customers overall, build models around what can be done to make customers have better data centers and computing environments, allowing for improved performance and management. For example, models can be built that look at the data and recommend additional products, additional services, proactive support engagements, etc.

In one embodiment, the data fans out into multiple use cases. For example, having all the information in the temporal topology graph, and the evolution of the data centers, allows the service provider to provide suggestions based on what a customer might need or want based on the aggregation of information about a specific customer and based on the aggregation of information about all customers.

In so doing, when a customer with a computing environment encounters a specific alert or issue, the service provider will already have an understanding of what the customer needs to resolve the issue. The conversation will start from a position of informed advise, versus starting from ground zero (e.g., who is this, what do you have, what is going on, etc.?).

Figure 6:
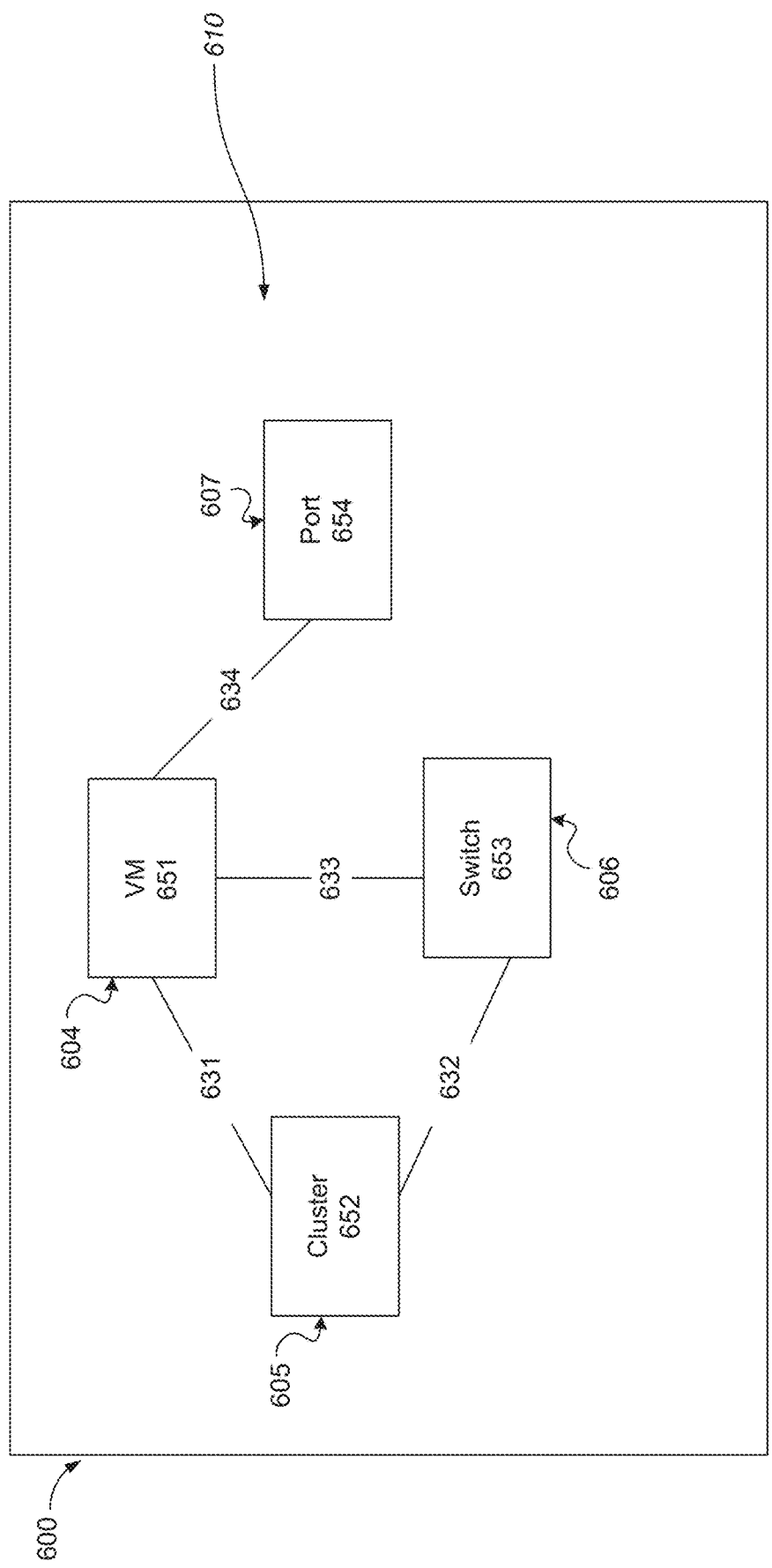
FIG. 6 illustrates a view of an example graphical user interface displaying the graph of the customer data center environment, in accordance with various embodiments.

FIG. 6 illustrates an example workflow of the graphical user interface (UI) 600 for providing the graph model 610 of the customer data center, in accordance with an embodiment.

In one embodiment, the viewer is a web based portal that internal support organization teams will access to view the current state of a customer's computing environment, presenting the temporal topology such that it is to easy grasp the scope and complexity of the customer's computing environment. When used as an investigation and scoping solution, the temporal topology graph will enable the ability to scroll back in time and observe how the environment has changed while drilling down into specific configurations, tasks and events that drove those changes. It does this in a non-product specific way to consider the intertwined relationships across our products as one holistic solution.

The service provider analytics platform utilizes a rule based analysis engine to identify known issues and deviations from best practice configurations in order to produce results that can be utilized by service provider teams to perform analytics on computing environments under the responsibility of the service provider. The service provider analytics platform will be further enhanced and integrated into a graphical user interface in order to make use of an efficient rule-based analysis engine where a library of support intelligence, product knowledge, and logic is stored and used to analyze the inbound streams of product information to produce recommendations and reports that can be delivered through multiple channels to administrators of the computing environments. Whether it is alerting when and where a customer has deviated from a provider validated deployment (e.g., VVD), misalignment to best practice configurations, or identifying failures and incidents that are tied directly to remediation steps through KB articles—assistance can be delivered either by direct support engagement with technical support engineers (TSEs) or automatically through self-service channels.

In one embodiment, reports are generated from the data that can be used with customers. One report is a proactive Operational Summary Report (on-going wellness): which, in one embodiment, includes weekly summary based on constant data flow of customer environment and run-time analysis. The report will include proactive data review and compilation of field notices/alerts/Knowledge Base's (KBs)/security issues, etc., and will include research analysis and run-time analysis based recommendations.

Another report is a Health Assessment Report (checkup): Includes recommendations to promote improvements in overall environment health and performance. The report will include a configuration review, prescriptive recommendations on design compliance, best practices recommendations, etc.

Thus, the three technology components the collector, viewer and advisor are utilized to provide a complete proactive support technology.

Figure 7A:
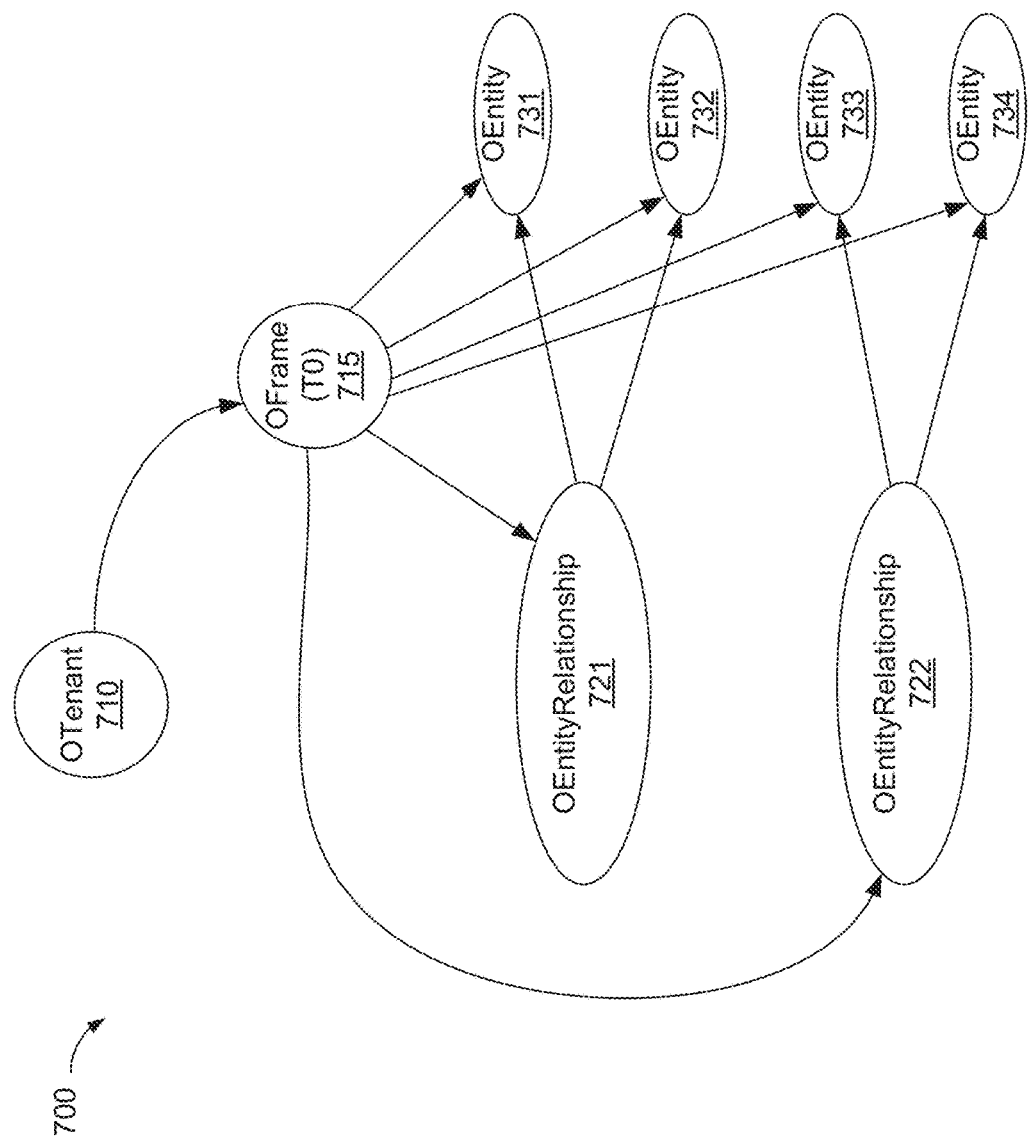
FIGS. 7A and 7B illustrate block diagrams of a data model at different times, in accordance with various embodiments.

FIG. 7A illustrates a block diagram of a data model 700 at T0 in accordance with various embodiments. FIG. 7A includes objects OTenant 710, OFrame 715, OEntityRelationship 721 and 722, and OEntity 731-734. While data model 700 includes two OEntityRelationship objects and four OEntity objects, it should be appreciated that the data model of the described embodiment may include any number of OEntityRelationship objects and OEntity objects.

An OFrame 715 represents a tenant's topology at a moment in time. It has a mapping of entities (OEntity 731-734) and relationships (OEntityRelationship 721 and 722) in that moment in time (T0 as illustrated). An OFrameDelta represents a topology change at a moment in time. It contains a mapping of added, deleted and modified entities/relationships at that moment in time. An OFrameDelta is essentially a topology revision and its contents are a changeset of what happened. The state of an OFrame can be reversed by applying OFrameDelta's in reverse chronological order.

Both OEntity 731-734 and OEntityRelationship 721 and 722 include an OMetadata. OMetadata hold all attributes pertaining to that entity/relationship at a moment in time. An OMetadataDelta represents a metadata change at a moment in time. It contains a mapping of added, deleted and modified attributes at that moment in time. An OMetadataDelta is essentially a metadata revision and its contents are a changeset of what happened. The state of an OEntity/OEntityRelationship's metadata can be reversed by applying OMetadataDelta's in reverse chronological order.

The following is a simple example of OFrame and OFrameDelta creation from t0 (initial data).

```
// tenant at t0
tenant : {
  frame: {
    timestamp: t0,
    entities: [ A, B, C ],
  }
  frameDelta: {
    timestamp: t0,
    addedEntities: [ A, B, C ],
    prevDelta: null
  }
}
// tenant at t1
tenant : {
  frame: {
    timestamp: t1,
    entities: [ X, Y, Z ],
  }
  frameDelta: {
    timestamp: t1,
    addedEntities: [ X, Y, Z ],
    deletedEntities: [ A, B, C ],
    prevDelta: t0
  }
}
```

An OMetadataDelta includes a map which describe the changes to metadata. A key in the metadata map may have an embedded map as a value containing key "+", "−" or both "+" and "−". These keys have the following meaning:

"+": attribute was added

"−": attribute was removed

"+" and "−": attribute was modified

The following is a simple example of OMetadataDelta creation:

```
// Entity A's metadata at t0
A : {
  metadata: {
    "foo" : "abc",
    "joe" : "smith"
  }
  metadataDelta: {
    timestamp: t0,
    map : {
      "foo" : { "+" : "abc" }, // added
      "joe" : { "+" : "abc" } // added
    }
    prevDelta: null
  }
}
// Entity A's metadata at t1
A : {
  metadata: {
    "foo" : "xyz",
    "bar" : "123"
  }
  metadataDelta: {
    timestamp: t1,
    map : {
      "foo" : { "−" : "abc", "+" : "xyz" }, // modified
      "bar" : { "+" : "123" }, // added
      "joe" : { "−" : "smith" } // deleted
    }
    prevDelta: t0
  }
}
```

By chaining together OFrameDelta's, the state of an OFrame 715 is effectively reversed to any moment in time by applying each delta in reverse chronological order. The same concept applies to OMetadataDelta revision chains. Each delta has a pointer to the previous delta, so traversing the delta chain is extremely fast, leveraging the power of a graph database. Retrieval of the previous delta is O(1). Creating and storing only "deltas" is the most efficient way to capture topology changes over time.

For efficiency purposes an OTenant 710 includes OFrame 715 which is a representation of the tenant's last know topology (entities/relationships). Each OEntity 731-734 and OEntityRelationship 721 and 722 includes OMetadataDelta which is a representation of their last know metadata. By knowing the "last known" state, the state of a tenant's topology can be effectively reversed.

For example, at T0, the objects OFrame 715, OEntity 731-734 and OEntityRelationship 721 and 722 are created, as well as the edges connecting the objects having relationships. As illustrated in FIG. 7A, edges are created from OFrame 715 to each of OEntity 731-734 and OEntityRelationship 721 and 722. Moreover, edges are created from OEntityRelationship 721 to OEntity 731 and 732, and from OEntityRelationship 722 to OEntity 733 and 734. In this way, OFrame 715 represents the topology at T0.

Figure 7B:
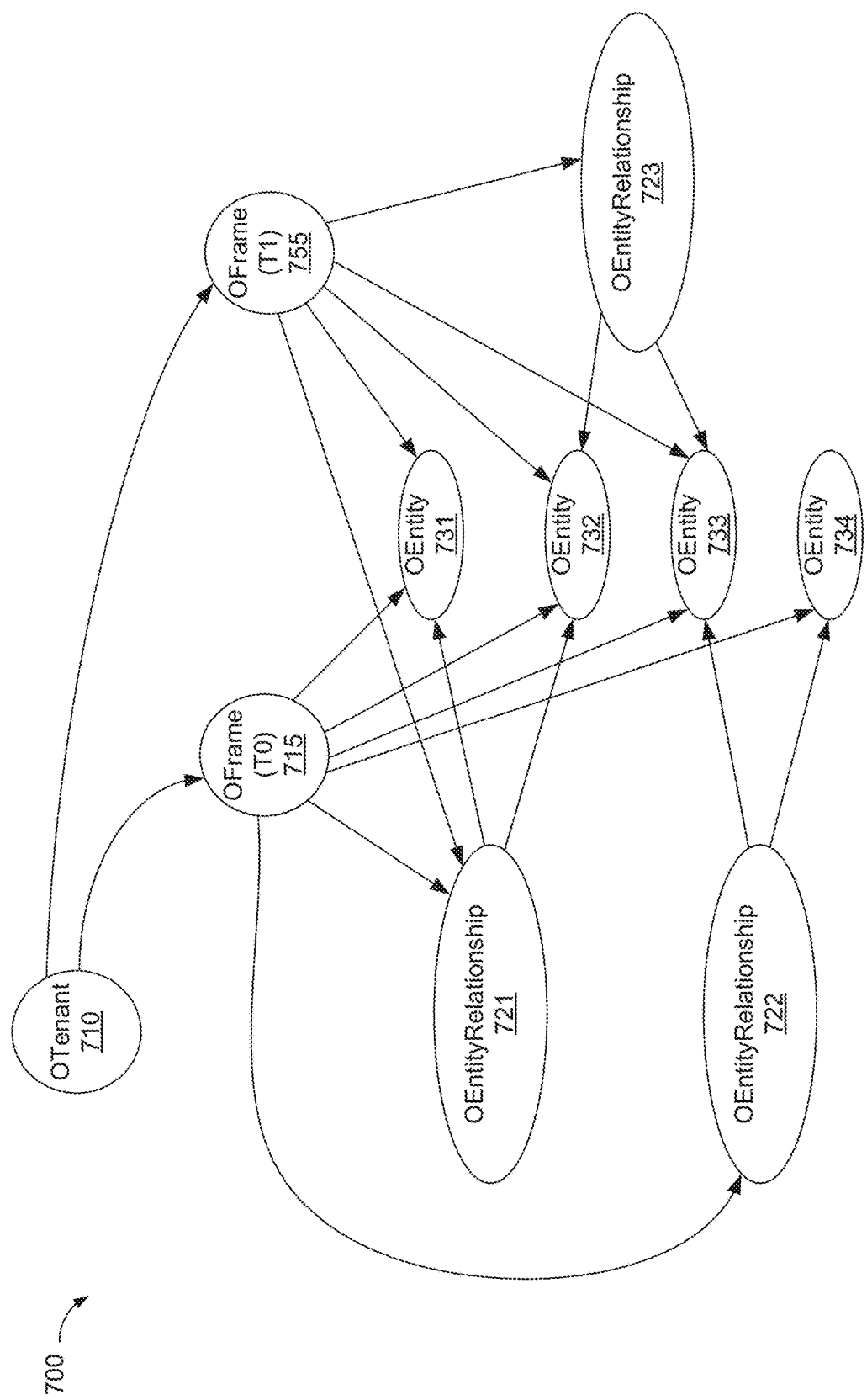

With reference to FIG. 7B, a block diagram of data model 700 at T1 is illustrated, in accordance with various embodiments. At T1, the objects OFrame 755 and OEntityRelationship 723 are created, as well as the edges connecting the objects having relationships at T1. As illustrated in FIG. 7B, edges from OFrame 755 to OEntityRelationship 721 and 723, edges from OFrame 755 to OEntity 731, 732, and 733, and edges from OEntityRelationship 723 to OEntity 732 and 733 are created. In this way, OFrame 755 represents the topology at T1.

It should be appreciated that objects are not deleted or removed from data model 700, but rather de-referenced from future OFrames if the object it represents is deleted or removed in the actual topology. For example, with reference to FIGS. 7A and 7B, at T1, data model 700 indicates that OEntity 734 no longer exists (e.g., was deleted), as OEntity 734 is de-referenced at T1. Moreover, at T1, the relationship between OEntity 731 and OEntity 732 still exists (as OFrame 755 references OEntityRelationship 721), while the relationship between OEntity 733 and OEntity 734 no longer exists (as OFrame 755 does not reference OEntityRelationship 722 and OEntity 734 does not exist. Moreover, a new relationship OEntityRelationship 723 between OEntity 732 and OEntity 733 now exists.

As described, data model 700 defines changes to the graph, and therefore the topology, over time as a continuous graph that can be navigated through time. For instance, the OFrame objects are used as paths in the continuous graph over time.

Figure 8:
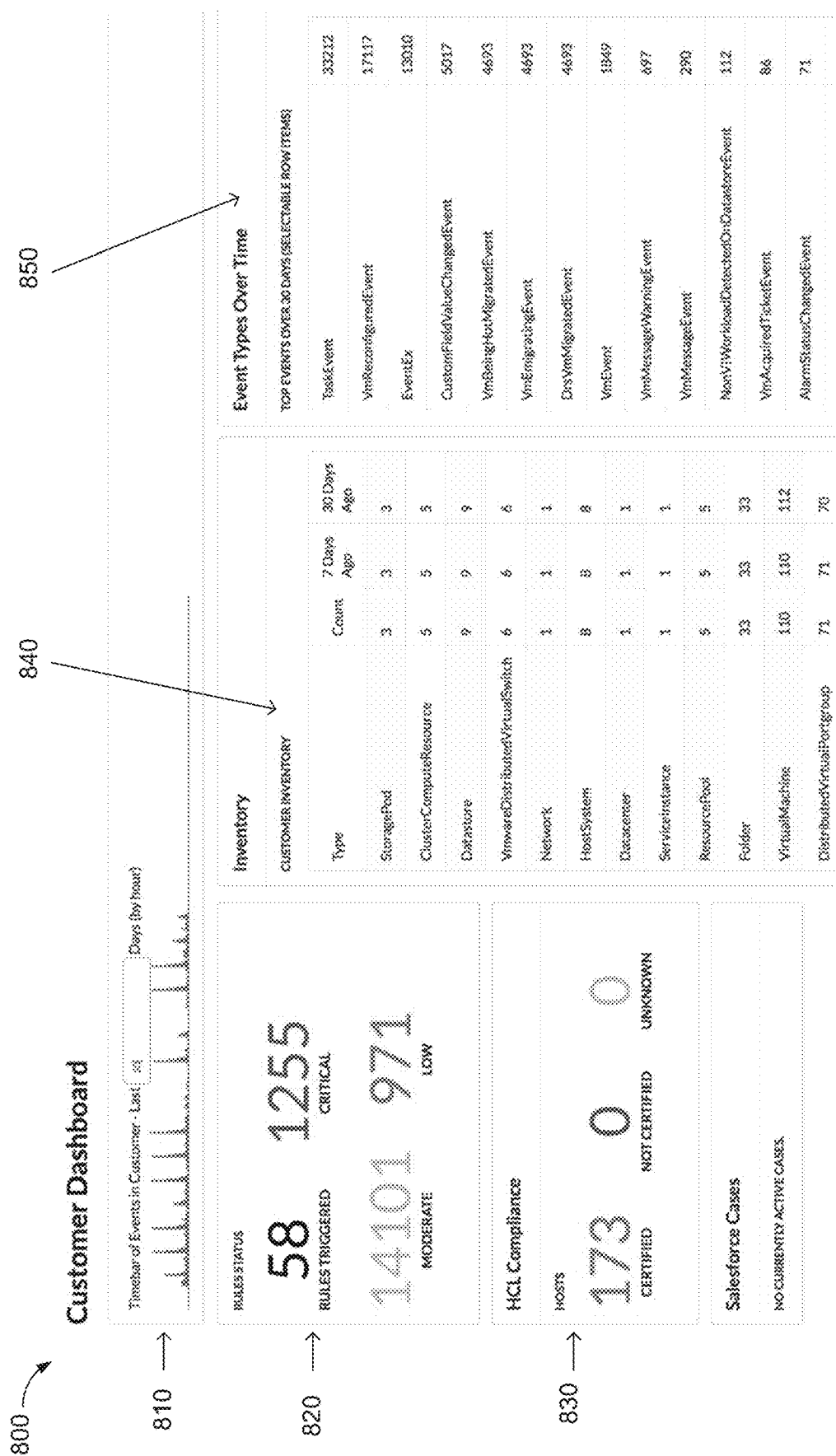
FIG. 8 illustrates an example screenshot of an analytics dashboard, in accordance with various embodiments.

FIG. 8 illustrates an example screenshot 800 of an analytics dashboard, in accordance with various embodiments. It should be appreciated that the analytics dashboard may be one screen of a UI for presenting analytics information. The analytics dashboard includes a high level view of the health of a computing environment under the analytic management of a service provider. As illustrated, the analytics dashboard includes a plurality of frames for presenting certain types of information.

As illustrated, the analytics dashboard includes frame 810 that illustrates a timebar of a number of events in the customer's computing environment over a selected period. This information is useful as it can assist in directing a support technician to isolate periods of high activity of the computing environment. Frame 820 illustrates a current status of rules maintained by the service provider that are applied to the computing environment. Frame 820 is informative as to how many rules have been triggered and whether the rules have identified critical, moderate, and low priority issues, as well as how many of each type of issue.

Frame 830 illustrates compliance of the computing environment with best known practices. Frame 840 illustrates a component inventory of the computing environment. It should be appreciated that the component environment can include hardware, software, and virtual components. Frame 850 illustrates a summary of the type of events detected over time within the computing environment.

Embodiments described herein provide for rendering a topology of the computing environment at a given point in time. For example, the rendering represent changes to the topology over time via a scroll bar over an available time range. Moving the slider changes the visualization of the topology (e.g., components come and go within the visualization).

Figure 9A:
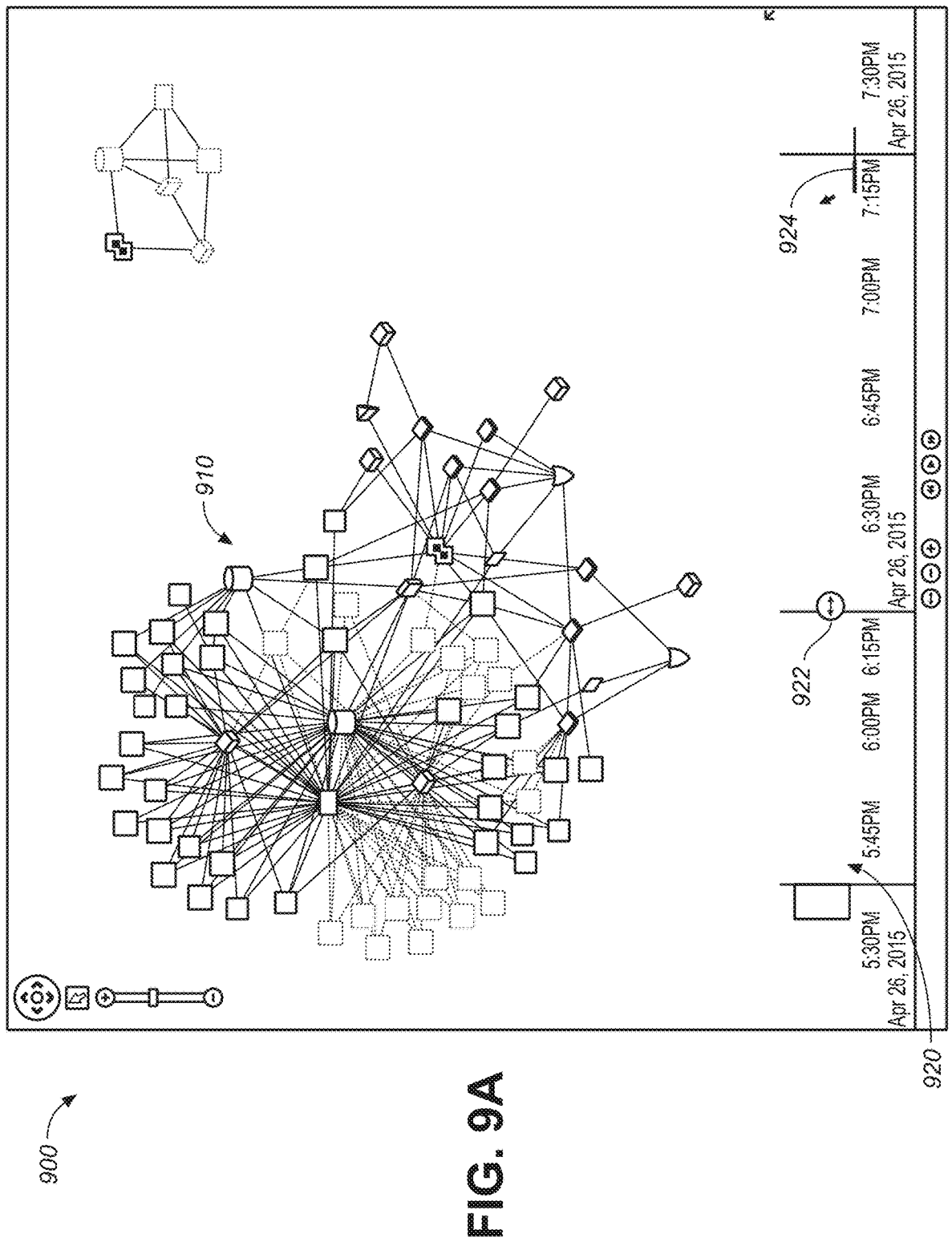
FIGS. 9A and 9B illustrate example screenshots of a temporal topology viewer, in accordance with various embodiments.
Figure 9B:
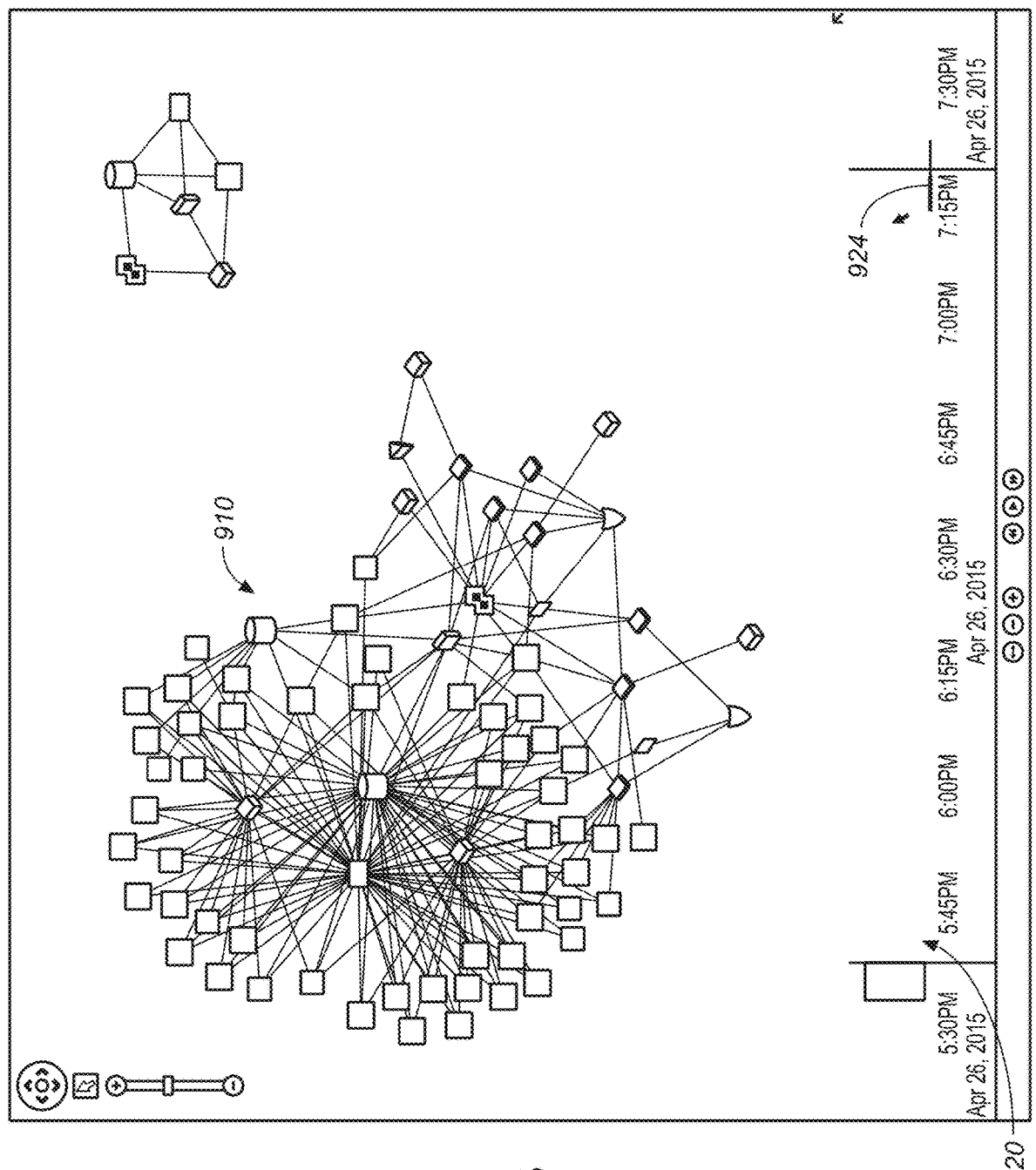

FIGS. 9A and 9B illustrate example screenshots 900 and 902 of a temporal topology viewer, in accordance with various embodiments. It should be appreciated that the temporal topology viewer may be one screen of a UI for presenting analytics information. The temporal topology viewer utilizes the relationship data collected from the computing environment to recreate the state of the topology at a selected time.

The temporal computing environment topology viewer is a portal that the remote service provider can access to view the current state of the computing environment, viewing topology to easily grasp the scope and complexity of the components (e.g., data centers) of the computing environment. The temporal computing environment topology viewer provides an investigation and scoping solution, and enables the ability to scroll back in time and observe how the computing environment has changed while drilling down into specific configurations, tasks and events that drove those changes. The temporal computing environment topology viewer provides for the temporal viewing of the computing environment in a non-product specific way to consider the intertwined relationships across the components of the computing environment as one holistic solution.

With reference to FIG. 9A, screenshot 900 illustrates the topology of computing environment 910 at time T1. Timebar 920 is a selectable interface for receiving a selection of a particular time of timebar 920. As illustrated, time 922 (T1) of timebar 920 is selected. As such, the state of the topology of computing environment 910 at time 922 is shown.

With reference to FIG. 9B, screenshot 902 illustrates the topology of computing environment 910 at time T2. As illustrated, time 924 (T2) of timebar 920 is selected. As such, the state of the topology of computing environment 910 at time 924 is shown. As can be seen with a visual comparison between the states of the topology of computing environment 910 at screenshots 900 and 902, the states of the topology of computing environment 910 changed between time T1 and time T2. A user can scroll through the different states of the topology of the computing environment by selecting different times of timebar 920.

Figure 10:
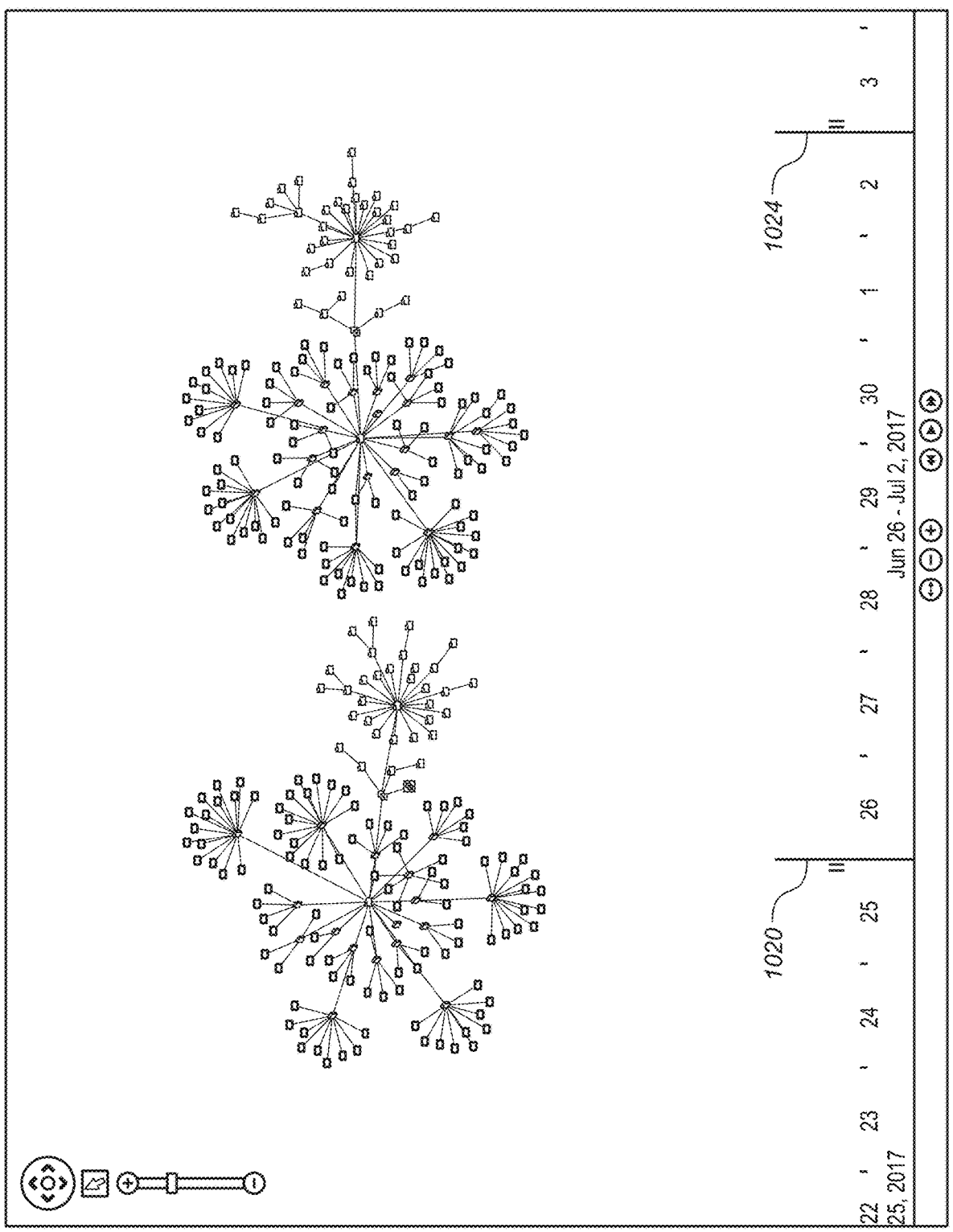
FIG. 10 illustrates an example screenshot of temporal topology viewer, in accordance with various embodiments.

FIG. 10 illustrates an example screenshot 1000 of temporal topology viewer, in accordance with various embodiments. It should be appreciated that the temporal topology viewer may be one screen of a UI for presenting analytics information. The temporal topology viewer utilizes the relationship data collected from the computing environment to recreate the state of the topology at a selected time. Screenshot 1000 illustrates the topology of computing environment 1010 at a selected time. Timebar 1020 is a selectable interface for receiving a selection of a particular time of timebar 1020. As illustrated, time 1024 of timebar 1020 is selected. As such, the state of the topology of computing environment 1010 at time 1024 is shown.

Figure 11:
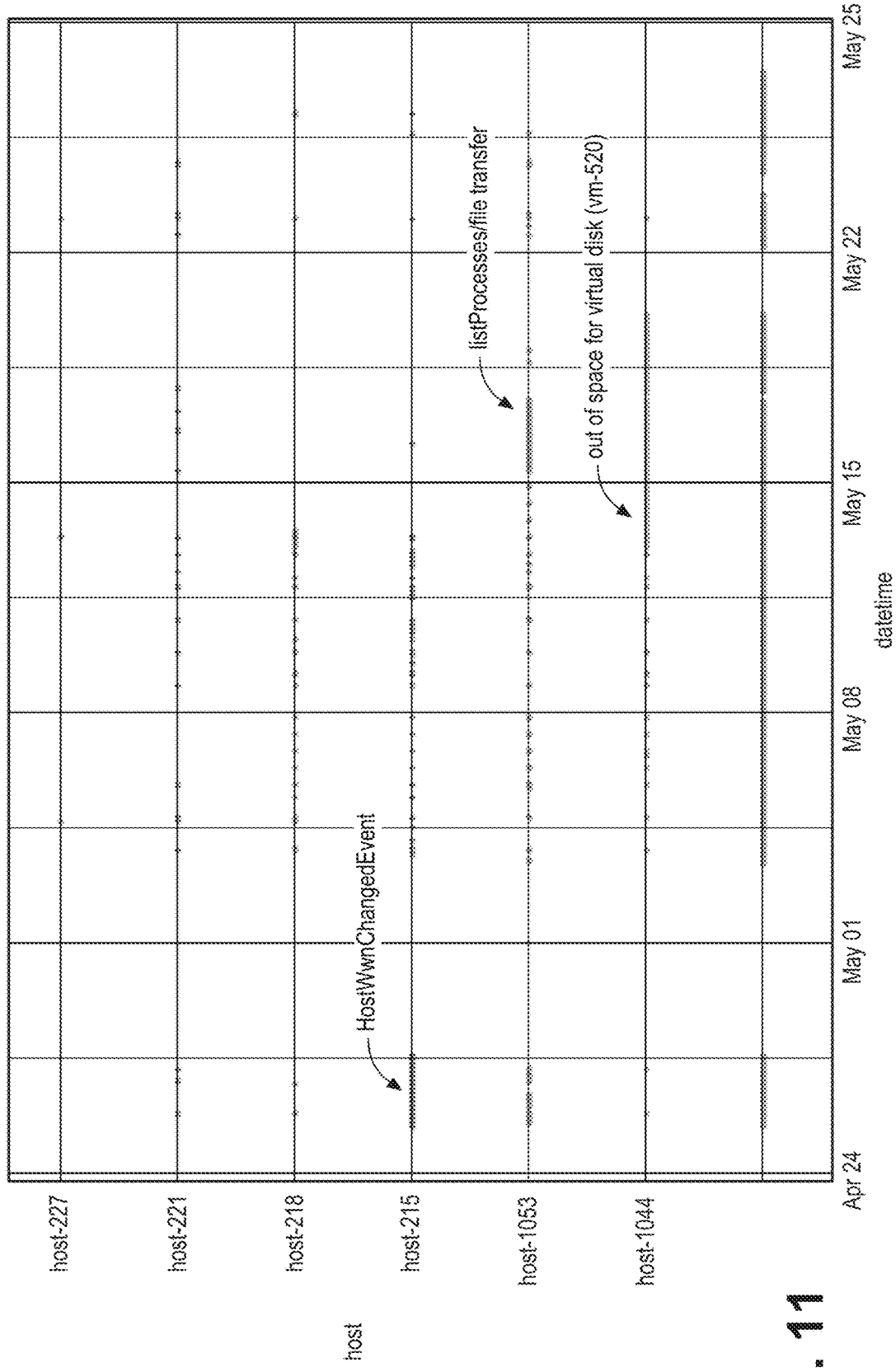
FIG. 11 illustrates an example screenshot of temporal event viewer, in accordance with various embodiments.

FIG. 11 illustrates an example screenshot 1100 of temporal event viewer, in accordance with various embodiments. It should be appreciated that the temporal event viewer may be one screen of a UI for presenting analytics information. The temporal event viewer utilizes the event data collected from the computing environment to illustrate the events occurring within the computing environment over time.

The temporal event viewer of FIG. 11 illustrates the events for each component of the computing environment (e.g., hosts as illustrated) over time. For example, host-1044 had a high incident of event data late on at approximately May 13 through May 20. These events generally were related to an "out of space for virtual disk" alert. This information is useful for visual analytics in that it identifies high incidents of alerts within certain time periods, which is informative in resolution of the alerts.

In some embodiments, events are linked to components within the topology. For example, object IDs of the components can be linked to events. Thus, these embodiments provide visual correlation between events and the topology at given times, allowing for event and component isolation. In some embodiments, events include a description of the event (e.g., power on, power off, etc.) and metadata (e.g., object ID of impacted components). The object ID can be linked to the topology where the object exists.

Figure 12:
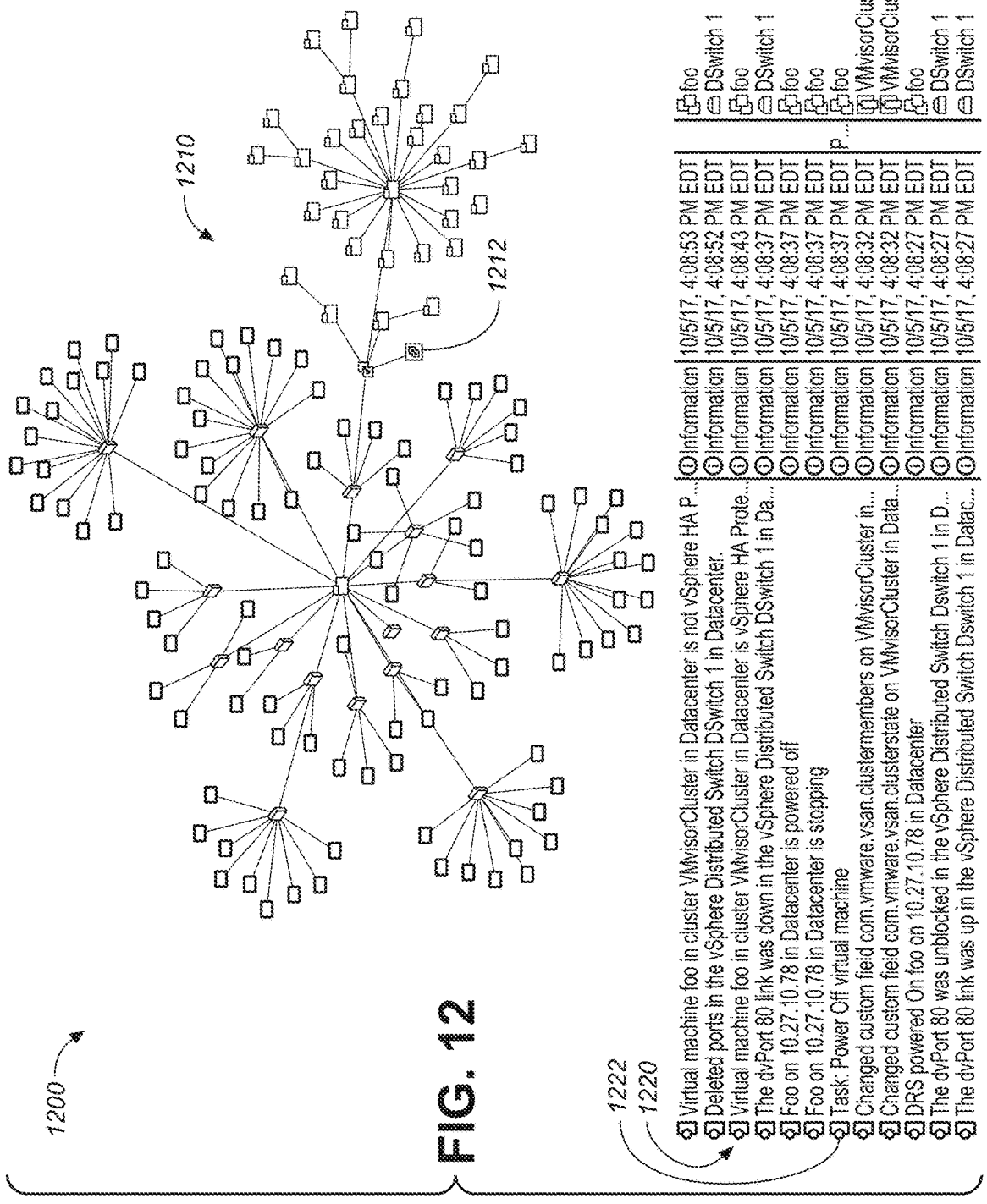
FIG. 12 illustrates an example screenshot of temporal topology and event data viewer, in accordance with various embodiments.

FIG. 12 illustrates an example screenshot 1200 of temporal topology and event data viewer, in accordance with various embodiments. It should be appreciated that the temporal topology and event data viewer may be one screen of a UI for presenting analytics information. The temporal topology and event data viewer utilizes the relationship data and event data collected from the computing environment to recreate the state of the topology at a selected time and to present the corresponding event information at the selected time. The illustrated temporal topology and event data viewer allows for visual comparison and reconciliation between events occurring in the computing environment and the corresponding state of the topology of the computing environment. This allows a user to visually correlate event data to changes in the topology of the computing environment, which can be very helpful in amelioration of problems, errors, and other issues in the computing environment.

With reference to FIG. 12, screenshot 1200 illustrates the topology of computing environment 1210 and the event data 1220 at a selected time. For example, at the selected time, virtual machine 1212 of computing environment 1210 is powered off, as indicated in event 1222. It should be appreciated that in some embodiments, a selection of a component of computing environment 1210 will highlight the corresponding event in event data 1220. Similarly, in some embodiments, a selection of an event in event data 1220 will highlight the corresponding component of computing environment 1210 related to the selected event.

Example Methods of Operation

The following discussion sets forth in detail the operation of some example methods of operation of embodiments. With reference to FIGS. 13 through 16, various flow diagrams illustrate example procedures used by various embodiments. The flow diagrams of FIGS. 13 through 16D include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 100 and/or host computer system 200). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagrams, such procedures are examples. That is, embodiments are well suited to performing various other procedures or variations of the procedures recited in the flow diagrams. Likewise, in some embodiments, the procedures in the flow diagrams of FIGS. 13 through 16D may be performed in an order different than presented and/or not all of the procedures described in one or more of these flow diagrams may be performed. It is further appreciated that procedures described in the flow diagrams of FIGS. 13 through 16D may be implemented in hardware, or a combination of hardware with firmware and/or software provided by computer system 100 and/or host computer system 200.

Figure 13:
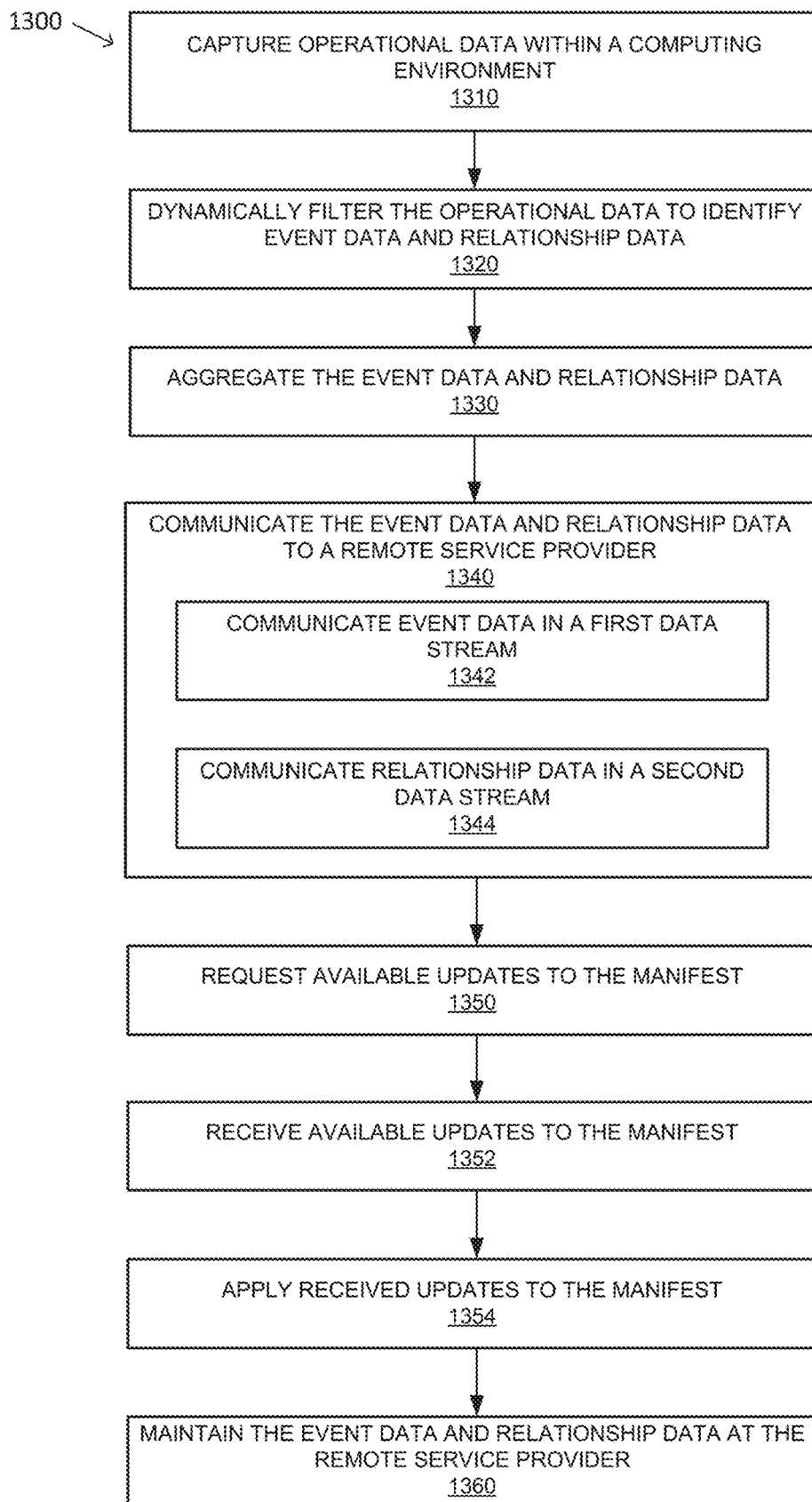
FIG. 13 depicts an example flow diagram for data collection in a computing environment, according to various embodiments.

FIG. 13 depicts a flow diagram 1300 for data collection in a computing environment, according to various embodiments. At procedure 1310 of flow diagram 1300, operational data is captured within a computing environment. The computing environment includes a plurality of managed components, where the managed components are interrelated. In one embodiment, the computing environment is a datacenter and the plurality of managed components includes hardware components and virtual components of the datacenter. In one embodiment, the capturing is performed by a collector virtual appliance residing within the computing environment. In one embodiment, the virtual collector appliance is communicably coupled with the plurality of managed components via a management interface component of the plurality of managed components.

At procedure 1320, the operational data is dynamically filtered within the computing environment to identify event data and managed component relationship data, where the event data and managed component relationship data include temporal information (e.g., time stamps). In one embodiment, an instance of the managed component relationship data is generated responsive to a change in topology of the plurality of managed components of the computing environment. In one embodiment, the managed component relationship data includes parent/child information for the plurality of managed components. In one embodiment, the filtering is performed by the collector virtual appliance according to a manifest maintained at the collector virtual appliance, wherein the manifest is configurable by the remote service provider. In one embodiment, as shown at procedure 1330, the event data and managed component relationship data is aggregated at the computing environment.

At procedure 1340, the event data and managed component relationship data is communicated to a remote service provider configured to perform analytics on the computing environment using the event data and managed component relationship data. In one embodiment, as shown at procedure 1342, the event data is communicated to the remote service provider in a first data stream. At procedure 1344, the managed component relationship data is communicated to the remote service provider in a second data stream.

In one embodiment, as shown at procedure 1350, the collector virtual appliance requests any available updates to the manifest from the remote service provider. In one embodiment, as shown at procedure 1352, an update to the manifest is received at the collector virtual appliance from the remote service provider. At procedure 1354, the update is applied to the manifest.

In one embodiment, as shown at procedure 1360, the event data and managed component relationship data is maintained at the remote service provider.

Figure 14:
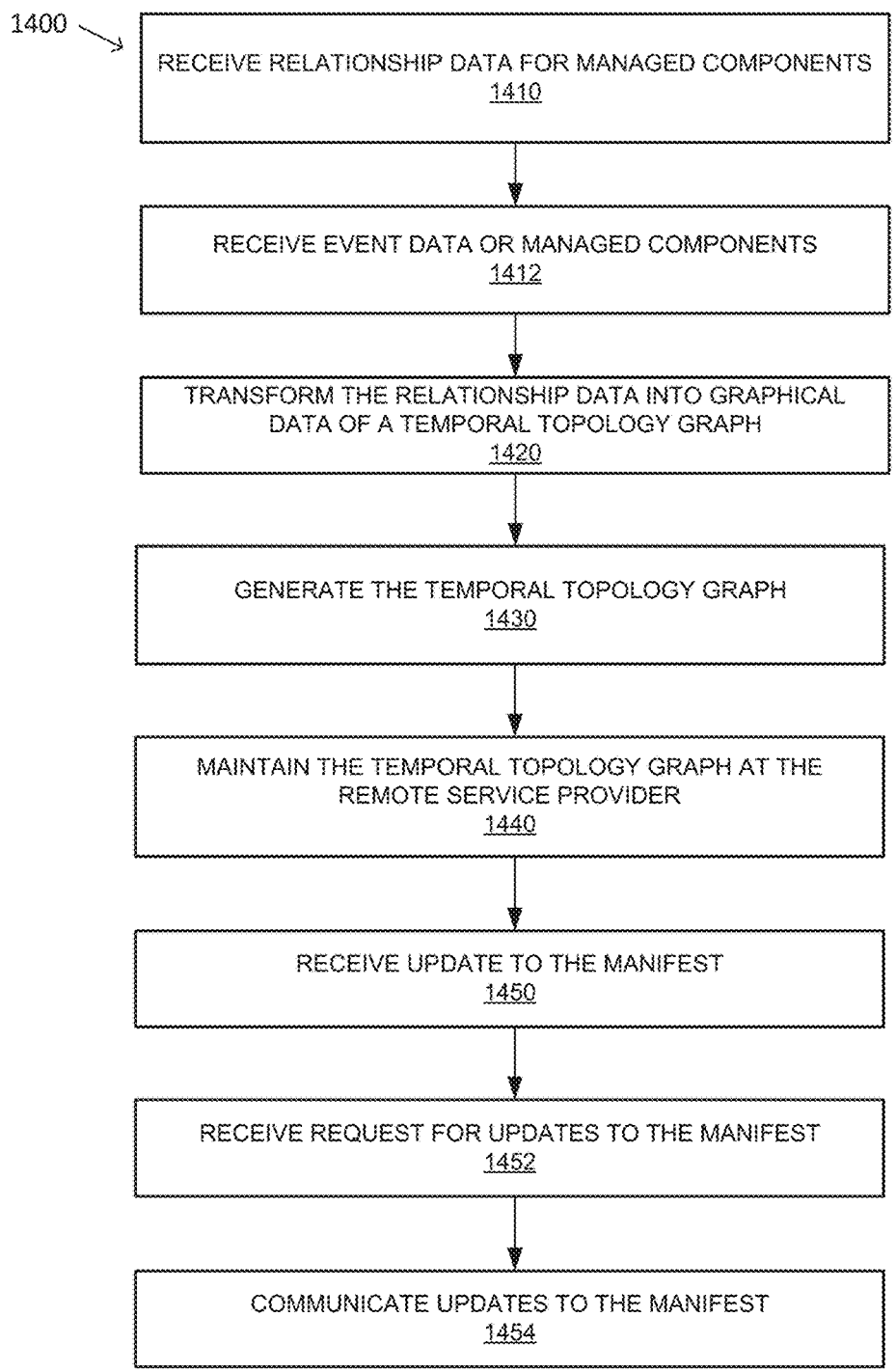
FIG. 14 depicts an example flow diagram for generating a temporal topology graph of a computing environment, according to various embodiments.

FIG. 14 depicts a flow diagram 1400 for generating a temporal topology graph of a computing environment, according to various embodiments. At procedure 1410 of flow diagram 1400, managed component relationship data for a plurality of managed components of a computing environment is received. The managed component relationship data includes parent/child information for a managed component of the plurality of managed components at a moment in time. In one embodiment, the computing environment is a datacenter and the plurality of managed components includes hardware components and virtual components of the datacenter. In one embodiment, an instance of the managed component relationship data is generated at the computing environment responsive to a change in topology of the plurality of managed components of the computing environment. In one embodiment, the managed component relationship data is received from a collector virtual appliance residing within the computing environment. In one embodiment, the collector virtual appliance maintains a manifest for filtering the managed component relationship data of the computing environment from operational data of the computing environment. In one embodiment, the manifest is extensible and configurable by the service provider. In one embodiment, a shown at procedure 1412, event data for the plurality of managed components of a computing environment is received.

At procedure 1420, the managed component relationship data is transformed into graphical data of a temporal topology graph of the computing environment, wherein the temporal topology graph includes the moment in time for each instance of the managed component relationship data within the temporal topology graph. At procedure 1430, the temporal topology graph including the managed component relationship data is generated based at least in part on the graphical data. At procedure 1440, the temporal topology graph is maintained for the computing environment at a service provider.

In one embodiment, as shown at procedure 1450, an update to the manifest is received, wherein the update includes a change in the managed component relationship data to be collected at the collector virtual appliance of the computing environment. At procedure 1452, in accordance with an embodiment, a request from the collector virtual appliance for any available updates to the manifest is received. In one embodiment, as shown at procedure 1454, an update to the manifest is communicated to the collector virtual appliance.

Figure 15:
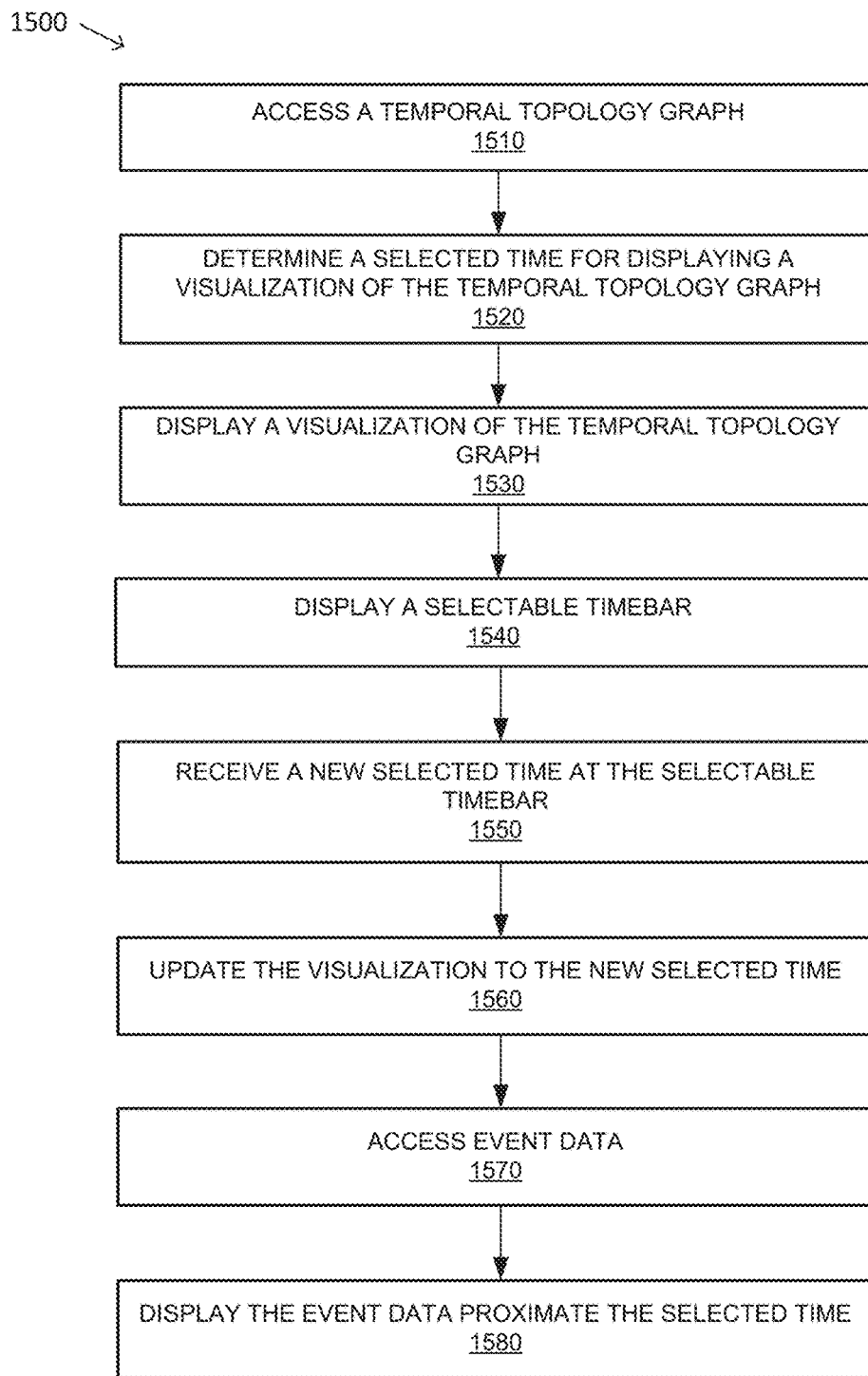
FIG. 15 depicts an example flow diagram for presenting a temporal topology graph of a computing environment at a graphical user interface, according to various embodiments.

FIG. 15 depicts a flow diagram 1500 for presenting a temporal topology graph of a computing environment at a graphical user interface, according to various embodiments. At procedure 1510 of flow diagram 1500, at a service provider, a temporal topology graph of a computing environment including a plurality of managed components is accessed. The temporal topology graph comprises managed component relationship data for the plurality of managed components over an available time range, wherein the service provider is remote to the computing environment. In one embodiment, the computing environment is a datacenter and the plurality of managed components includes hardware components and virtual components of the datacenter.

In one embodiment, an instance of the managed component relationship data is generated responsive to a change in topology of the plurality of managed components of the computing environment. In one embodiment, the temporal topology graph comprises graphical data based on the managed component relationship data. In one embodiment, the graphical data comprises nodes and edges, wherein the nodes comprise information identifying the plurality of managed components and wherein the edges comprise relationship information between the plurality of managed components.

At procedure 1520, a selected time of the available time range for displaying a visualization of the temporal topology graph is determined. At procedure 1530, a visualization of the temporal topology graph of the computing environment is displayed at the selected time in a graphical user interface, wherein the visualization comprises a topology of the plurality of managed components and parent/child relationships interconnecting the plurality of managed components at the selected time.

In one embodiment, as shown at procedure 1540, a selectable timebar for receiving a selected time over the available time range is displayed. At procedure 1550, a new selected time of the available time range is received at the selectable timebar. At procedure 1560, the visualization of the computing environment is updated to display the topology of the computing environment at the new selected time.

In one embodiment, as shown at procedure 1570, event data for the plurality of managed components of the computing environment is accessed, wherein the event data comprises temporal information. At procedure 1580, the event data proximate the selected time is displayed within the graphical user interface based on the temporal information. In one embodiment, the event data comprises at least one managed component identifier. In one embodiment, responsive to receiving a selection of an event of the event data, a corresponding managed component is highlighted within the graphical user interface based on the at least one managed component identifier. In another embodiment, responsive to receiving a selection of a managed component, a corresponding event is highlighted within the graphical user interface based on the at least one managed component identifier.

Figure 16A:
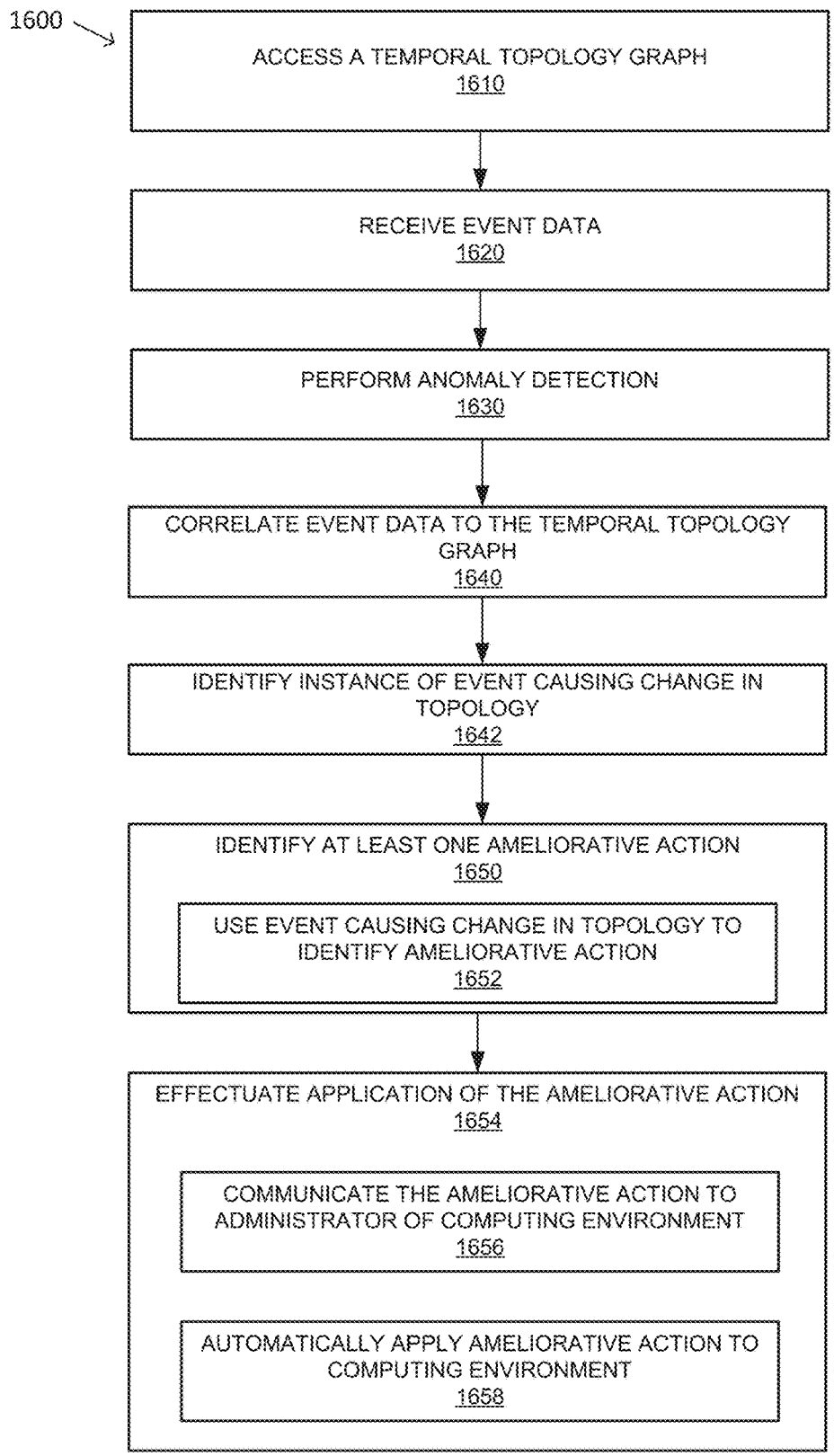
FIG. 16A depicts an example flow diagram for temporal analysis of a computing environment using event data and managed component relationship data, according to various embodiments.

FIG. 16A depicts a flow diagram 1600 for temporal analysis of a computing environment using event data and managed component relationship data, according to various embodiments. At procedure 1610 of flow diagram 1600, at a service provider, a temporal topology graph of a computing environment including a plurality of managed components is accessed. The temporal topology graph includes managed component relationship data, wherein the service provider is remote to the computing environment. In one embodiment, the computing environment is a datacenter and the plurality of managed components includes hardware components and virtual components of the datacenter.

Figure 16B:
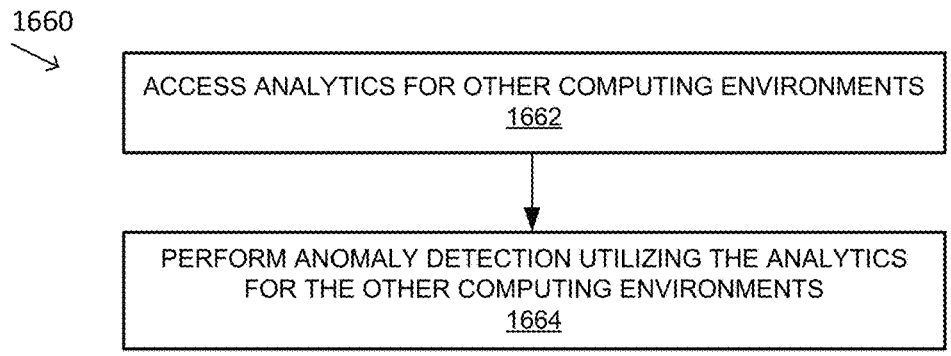
FIGS. 16B through 16D depict example flow diagrams illustrating for methods for performing anomaly detection, according to various embodiments.
Figure 16C:
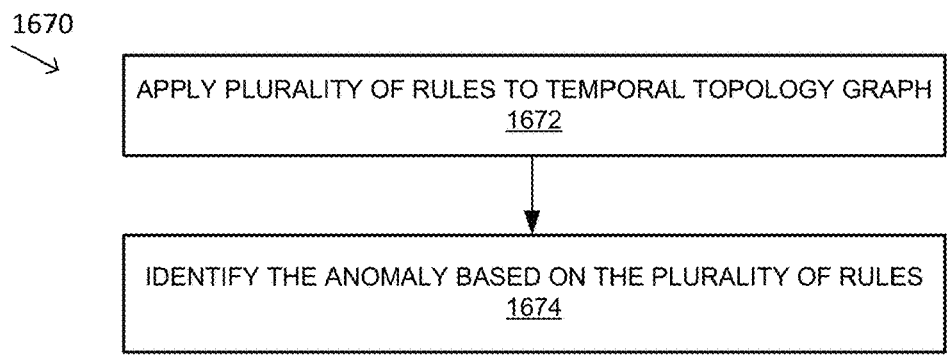
Figure 16D:
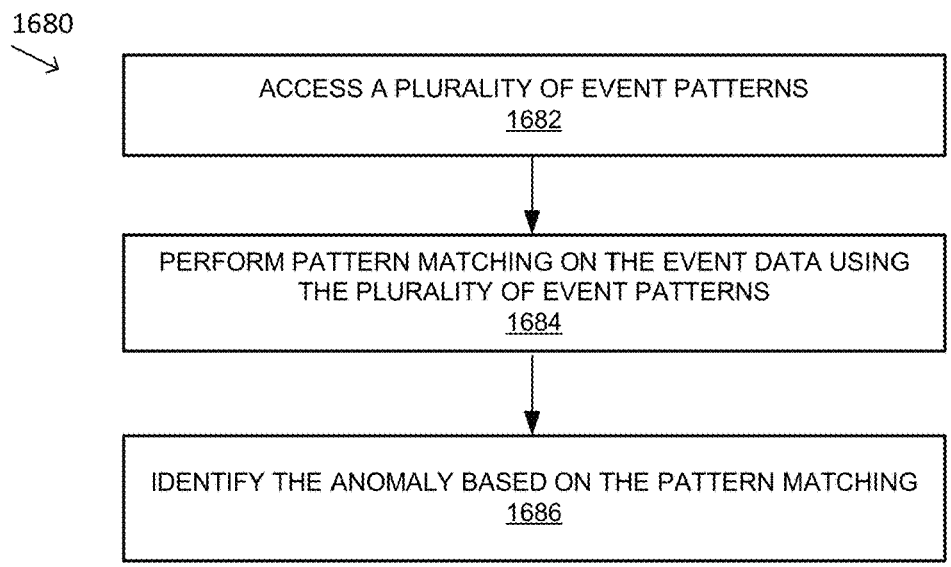

At procedure 1620, event data for the plurality of managed components of the computing environment is received. At procedure 1630, anomaly detection of the computing environment is performed based on the event data and the temporal topology graph of the computing environment, where an anomaly is indicative of a non-ideal state of the computing environment. FIGS. 16B through 16D depict flow diagrams 1660, 1670, and 1680, illustrating for methods for performing anomaly detection, according to various embodiments.

With reference to FIG. 16B, at procedure 1662 of flow diagram 1660, analytics for other computing environments under the management of the service provider are accessed. At procedure 1664, the anomaly detection of the computing environment is performed utilizing the analytics for other computing environments.

With reference to FIG. 16C, at procedure 1672 of flow diagram 1670, a plurality of rules is applied to the temporal topology graph. At procedure 1674, the anomaly is identified based on the plurality of rules.

With reference to FIG. 16D, at procedure 1682 of flow diagram 1680, a plurality of event patterns is accessed. At procedure 1684, pattern matching on the event data is performed by comparing a portion of the event data to the plurality of event patterns. In one embodiment, the pattern matching is performed utilizing machine-learning. At procedure 1686, the anomaly is identified based on the pattern matching.

In one embodiment, as shown at procedure 1640, the event data is correlated to the temporal topology graph. At procedure 1642, an instance of the event data causing a change in topology of the computing environment is identified.

With reference to FIG. 16A, at procedure 1650, at least one ameliorative action to apply to the computing environment for correcting the anomaly is identified. In one embodiment, as shown at procedure 1652, the instance of the event data causing a change in topology of the computing environment is used to identify the ameliorative action.

At procedure 1654, application of the at least one ameliorative action to the computing environment is effectuated. In one embodiment, as shown at procedure 1656, the ameliorative action is communicated to an administrator of the computing environment. In another embodiment, as shown at procedure 1658, the ameliorative action is automatically applied to the computing environment Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for generating a temporal topology graph of a computing environment on a graphical user interface (GUI), the method comprising:
    generating, at a plurality of managed components of the computing environment, managed component relationship data for the plurality of managed components, the managed component relationship data comprising parent/child information for a managed component of the plurality of managed components and temporal information at a moment in time, wherein the managed component relationship data is generated at each managed component of the plurality of managed components;
    capturing, at a collector virtual appliance of the computing environment, operational data communicated over the computing environment, the operational data comprising the managed component relationship data and other data;
    filtering, at the collector virtual appliance of the computing environment, the managed component relationship data from the operational data, wherein the filtering is performed according to a manifest;
    receiving, at a service provider, the managed component relationship data for the plurality of managed components of the computing environment;
    transforming, by the service provider, the managed component relationship data into graphical data of a temporal topology graph of the computing environment, the graphical data comprising nodes and edges, wherein the nodes comprise information identifying the plurality of managed components and the edges comprises relationship information between the plurality of managed components;
    generating, by the service provider, the temporal topology graph on the GUI, the temporal topology graph comprising the managed component relationship data based at least in part on the graphical data, wherein the temporal topology graph comprises the moment in time for each instance of the managed component relationship data within the temporal topology graph;
    maintaining, by the service provider, the temporal topology graph for the computing environment; and
    receiving a user interaction, at the service provider, with the temporal topology graph via the GUI to incrementally step through the temporal topology graph to view instances of the managed component relationship data at one or more moments in time.

2. The computer-implemented method of claim 1, wherein the computing environment is a datacenter and the plurality of managed components comprises hardware components and virtual components of the datacenter.

3. The computer-implemented method of claim 1, wherein the manifest is extensible and configurable by the service provider.

4. The computer-implemented method of claim 1, further comprising:
    receiving an update to the manifest, wherein the update comprises a change in the managed component relationship data to be collected at the collector virtual appliance of the computing environment.

5. The computer-implemented method of claim 1, further comprising:
    communicating an update of the manifest to the collector virtual appliance.

6. The computer-implemented method of claim 5, further comprising:
    receiving a request from the collector virtual appliance for any available updates to the manifest.

7. The computer-implemented method of claim 1, wherein an instance of the managed component relationship data is generated at the computing environment responsive to a change in topology of the plurality of managed components of the computing environment.

8. The computer-implemented method of claim 1, further comprising:
    receiving event data for the plurality of managed components of the computing environment.

9. A non-transitory computer readable storage medium having computer readable program code stored thereon for causing a computer system to perform a method for generating a temporal topology graph of a computing environment on a graphical user interface (GUI), the method comprising:
    generating, at a plurality of managed components of the computing environment, managed component relationship data for the plurality of managed components, the managed component relationship data comprising parent/child information for a managed component of the plurality of managed components and temporal information at a moment in time, wherein an instance of the managed component relationship data is generated at the computing environment responsive to a change in topology of the plurality of managed components of the computing environment, wherein the managed component relationship data is generated at each managed component of the plurality of managed components;
    capturing operational data communicated over the computing environment, the operational data comprising the managed component relationship data and other data;
    filtering the managed component relationship data from the operational data, wherein the filtering is performed according to a manifest;
    receiving the managed component relationship data for the plurality of managed components of the computing environment at a service provider of the computing environment;
    transforming the managed component relationship data into graphical data of a temporal topology graph of the computing environment, the graphical data comprising nodes and edges, wherein the nodes comprise information identifying the plurality of managed components and the edges comprises relationship information between the plurality of managed components;

generating the temporal topology graph on the GUI, the temporal topology graph comprising the managed component relationship data based at least in part on the graphical data, wherein the temporal topology graph comprises the moment in time for each instance of the managed component relationship data within the temporal topology graph;

maintaining the temporal topology graph for the computing environment at the service provider; and receiving a user interaction with the temporal topology graph via the GUI to incrementally step through the temporal topology graph to view instances of the managed component relationship data at one or more moments in time.

10. The non-transitory computer readable storage medium of claim 9, wherein the computing environment is a datacenter and the plurality of managed components comprises hardware components and virtual components of the datacenter.

11. The non-transitory computer readable storage medium of claim 9, wherein the manifest is extensible and configurable by the service provider.

12. The non-transitory computer readable storage medium of claim 9, the method further comprising:
receiving an update to the manifest, wherein the update comprises a change in the managed component relationship data to be collected at a collector virtual appliance of the computing environment.

13. The non-transitory computer readable storage medium of claim 9, the method further comprising:
communicating an update of the manifest to a collector virtual appliance of the computing environment.

14. The non-transitory computer readable storage medium of claim 13, the method further comprising:
receiving a request from the collector virtual appliance for any available updates to the manifest.

15. The non-transitory computer readable storage medium of claim 9, the method further comprising:
receiving event data for the plurality of managed components of the computing environment.

16. A system for manifest-driven data collection in a computing environment, the system comprising:
a data storage unit; and
a processor communicatively coupled with the data storage unit, the processor configured to:

generate event data and managed component relationship data for a plurality of managed components, the managed component relationship data comprising parent/child information for a managed component of the plurality of managed components and temporal information at a moment in time, wherein an instance of the managed component relationship data is generated at the computing environment responsive to a change in topology of the plurality of managed components of the computing environment, wherein the managed component relationship data is generated at each managed component of the plurality of managed components;

capture operational data communicated over the computing environment, the operational data comprising the managed component relationship data and other data;

filter the managed component relationship data from the operational data, wherein the filtering is performed according to a manifest;

receive the event data and the managed component relationship data for the plurality of managed components of the computing environment at a service provider of the computing environment;

transform the managed component relationship data into graphical data of a temporal topology graph of the computing environment, the graphical data comprising nodes and edges, wherein the nodes comprise information identifying the plurality of managed components and the edges comprises relationship information between the plurality of managed components;

generate the temporal topology graph on a graphical user interface (GUI), the temporal topology graph comprising the managed component relationship data based at least in part on the graphical data, wherein the temporal topology graph comprises the moment in time for each instance of the managed component relationship data within the temporal topology graph;

maintain the temporal topology graph and the event data for the computing environment; and receive a user interaction with the temporal topology graph via the GUI to incrementally step through the temporal topology graph to view instances of the managed component relationship data at one or more moments in time.

* * * * *